US012686563B2

(12) United States Patent
Gravelle et al.

(10) Patent No.: US 12,686,563 B2
(45) Date of Patent: Jul. 21, 2026

(54) AUTOMATED STORAGE AND RETRIEVAL SYSTEM REDUCING BIN MOVES BY SELECTING MULTI-STOCK BINS CONTAINING HIGHEST NUMBER OF SKUS ON WORKSTATION STOCK WAITLIST

(71) Applicant: ATTABOTICS INC., Calgary (CA)

(72) Inventors: Scott Gravelle, Calgary (CA); Douglas Raymond Langen, Calgary (CA); Spencer Hayes Nichols, Calgary (CA)

(73) Assignee: LAFAYETTE SYSTEMS CANADA ULC, Calgary (CA)

( * ) Notice: Subject to any disclaimer, the term of this patent is extended or adjusted under 35 U.S.C. 154(b) by 699 days.

(21) Appl. No.: 17/832,461

(22) PCT Filed: Nov. 30, 2020

(86) PCT No.: PCT/CA2020/051641
§ 371 (c)(1),
(2) Date: Jun. 3, 2022

(87) PCT Pub. No.: WO2021/108899
PCT Pub. Date: Jun. 10, 2021

(65) Prior Publication Data
US 2023/0133964 A1     May 4, 2023

Related U.S. Application Data

(60) Provisional application No. 63/118,860, filed on Nov. 27, 2020, provisional application No. 62/943,049, filed on Dec. 3, 2019.

(51) Int. Cl.
B65G 1/137      (2006.01)
B65G 1/04       (2006.01)
(Continued)

(52) U.S. Cl.
CPC ......... B65G 1/1378 (2013.01); B65G 1/0492 (2013.01); B65G 1/1371 (2013.01);
(Continued)

(58) Field of Classification Search
CPC .. B65G 1/1378; B65G 1/1371; B65G 47/905; B65G 2201/0258; B65G 2203/0241;
(Continued)

(56) References Cited

U.S. PATENT DOCUMENTS 1,465,135  A     8/1923  Kehr
4,088,232  A     5/1978  Lilly
(Continued)

FOREIGN PATENT DOCUMENTS

AU     2020231623  A1     7/2021
AU     2020234099  A1     7/2021
(Continued)

OTHER PUBLICATIONS

Extended European Search Report issued in application No. 20895061.8 on Oct. 31, 2023.
(Continued)

*Primary Examiner* — Thomas Randazzo
(74) *Attorney, Agent, or Firm* — Knobbe Martens Olson & Bear LLP

(57)     ABSTRACT

An automated storage and retrieval system stores multi-stock bins each holding different stock-keeping units (SKUs). Records dynamically track which SKUs are in each bin. A controller tracks a stock waitlist indicating quantities of SKUs still required to be delivered to a workstation in order to fulfil current orders assigned to the workstation. When a robot is available, the controller selects a multi-stock bin that has a highest number of unique ones of the required SKUs indicated on the stock waitlist and commands the robot to fetch and deliver the selected bin to the
(Continued)

workstation. For new orders, the controller may determine if direct assignment can be done to a workstation without additional bins being scheduled. For other pending orders, the controller may assume each pending order is assigned to the workstation and then pick the order that would require a lowest number of bins to be delivered to the workstation.

34 Claims, 18 Drawing Sheets

(51) Int. Cl.
　　　*B65G 47/90*　　　　(2006.01)
　　　*G06Q 10/08*　　　　(2024.01)
(52) U.S. Cl.
　　　CPC ........... *B65G 47/905* (2013.01); *G06Q 10/08* (2013.01); *B65G 2201/0258* (2013.01); *B65G 2203/0241* (2013.01); *B65G 2209/10* (2013.01)
(58) Field of Classification Search
　　　CPC ............ B65G 2209/10; B65G 2209/04; B65G 1/0492; G06Q 10/04; G06Q 10/08; G05B 2219/45063
　　　See application file for complete search history.

(56) References Cited

U.S. PATENT DOCUMENTS

| | | | |
|---|---|---|---|
| 4,428,708 | A | 1/1984 | Burt |
| 4,750,633 | A | 6/1988 | Schäfer |
| 4,815,190 | A | 3/1989 | Haba et al. |
| 4,817,071 | A | 3/1989 | Carlson et al. |
| 5,024,571 | A | 6/1991 | Shahar et al. |
| 5,174,707 | A | 12/1992 | Suekane et al. |
| 5,190,427 | A | 3/1993 | Lai |
| 5,272,805 | A | 12/1993 | Akeel et al. |
| 5,314,285 | A | 5/1994 | Lai |
| 5,374,231 | A | 12/1994 | Obrist et al. |
| 5,595,263 | A | 1/1997 | Pignataro |
| 6,148,291 | A | 11/2000 | Radican |
| 6,236,901 | B1 | 5/2001 | Goss et al. |
| 6,665,582 | B1 | 12/2003 | Moritz et al. |
| 6,711,798 | B2 | 3/2004 | Sanders et al. |
| 6,853,875 | B1 | 2/2005 | Moritz et al. |
| 6,974,928 | B2 | 12/2005 | Bloom |
| 7,168,548 | B2 | 1/2007 | Naumann et al. |
| 7,209,887 | B2 | 4/2007 | Yen et al. |
| 7,267,518 | B2 | 9/2007 | Kinzer |
| 7,289,969 | B1 | 10/2007 | Ballenger et al. |
| 7,308,330 | B2 | 12/2007 | Jones |
| 7,331,471 | B1 | 2/2008 | Shakes et al. |
| 7,381,022 | B1 | 6/2008 | King |
| 7,591,630 | B2 | 9/2009 | Lert |
| 7,596,508 | B1 | 9/2009 | McGuffie et al. |
| 7,669,763 | B2 | 3/2010 | Ernesti et al. |
| 7,686,171 | B1 | 3/2010 | Shakes et al. |
| 7,711,657 | B1 | 5/2010 | Huberman et al. |
| 7,770,792 | B2 | 8/2010 | Bruns et al. |
| 7,861,844 | B2 | 1/2011 | Hayduchok et al. |
| 7,931,431 | B2 | 4/2011 | Benedict et al. |
| 7,963,384 | B2 | 6/2011 | Lafontaine |
| 8,090,626 | B1 | 1/2012 | Wijaya et al. |
| 8,104,601 | B2 | 1/2012 | Hayduchok et al. |
| 8,104,681 | B2 | 1/2012 | Eisenson |
| 8,276,740 | B2 | 10/2012 | Hayduchok et al. |
| 8,306,650 | B1 | 11/2012 | Antony et al. |
| 8,527,373 | B1 | 9/2013 | Ricci et al. |
| 8,533,053 | B2 | 9/2013 | Brown et al. |
| 8,622,194 | B2 | 1/2014 | Dewitt et al. |
| 8,628,289 | B1 | 1/2014 | Benedict et al. |
| 8,682,473 | B1 | 3/2014 | Ramey et al. |
| 8,731,708 | B2 | 5/2014 | Shakes et al. |
| 8,896,442 | B1 | 11/2014 | Khan et al. |
| 8,928,481 | B2 | 1/2015 | Abe |
| 8,965,560 | B2 | 2/2015 | Franz et al. |
| 8,965,562 | B1 | 2/2015 | Wurman et al. |
| 8,972,045 | B1 | 3/2015 | Mountz et al. |
| 8,983,647 | B1 | 3/2015 | Dwarakanath et al. |
| 8,996,157 | B2 | 3/2015 | Collin |
| 9,009,072 | B2 * | 4/2015 | Mountz .................. G06Q 10/08 |
| | | | 705/28 |
| 9,010,517 | B2 | 4/2015 | Hayduchok et al. |
| 9,020,632 | B2 | 4/2015 | Naylor |
| 9,073,736 | B1 | 7/2015 | Hussain et al. |
| 9,120,621 | B1 | 9/2015 | Curlander et al. |
| 9,122,566 | B2 | 9/2015 | Bastian et al. |
| 9,122,586 | B2 | 9/2015 | Ma et al. |
| 9,139,363 | B2 | 9/2015 | Lert |
| 9,187,244 | B2 | 11/2015 | Toebes et al. |
| 9,202,194 | B1 | 12/2015 | Mistry |
| 9,218,585 | B2 | 12/2015 | Gupta et al. |
| 9,309,056 | B2 | 4/2016 | Lafontaine |
| 9,315,320 | B2 | 4/2016 | Kawano |
| 9,422,108 | B2 | 8/2016 | Hognaland |
| 9,533,828 | B1 | 1/2017 | Dwarakanath et al. |
| 9,551,987 | B1 | 1/2017 | Mountz et al. |
| 9,580,248 | B2 | 2/2017 | Hasman et al. |
| 9,598,239 | B2 | 3/2017 | Lert |
| 9,600,798 | B2 | 3/2017 | Battles et al. |
| 9,604,781 | B2 | 3/2017 | Stevens et al. |
| 9,682,822 | B2 | 6/2017 | Lindbo et al. |
| 9,687,883 | B2 | 6/2017 | Hayduchok et al. |
| 9,725,242 | B2 | 8/2017 | Issing et al. |
| 9,733,646 | B1 | 8/2017 | Nusser et al. |
| 9,792,577 | B2 * | 10/2017 | Mountz ............... B65G 1/1378 |
| 9,796,080 | B2 | 10/2017 | Lindbo et al. |
| 9,796,527 | B1 | 10/2017 | Kaukl et al. |
| 9,802,759 | B2 | 10/2017 | Lert, Jr. |
| 9,815,625 | B2 | 11/2017 | Dewitt et al. |
| 9,821,960 | B2 | 11/2017 | Issing |
| 9,845,208 | B2 | 12/2017 | Lindbo |
| 9,884,721 | B2 | 2/2018 | Suemitsu et al. |
| 9,932,170 | B2 | 4/2018 | Munholland |
| 10,000,338 | B2 | 6/2018 | Lert |
| 10,018,397 | B2 | 7/2018 | Hognaland et al. |
| 10,040,632 | B2 | 8/2018 | Lert |
| 10,051,599 | B2 | 8/2018 | Lowe et al. |
| 10,052,661 | B2 | 8/2018 | Hayduchok et al. |
| 10,062,047 | B2 | 8/2018 | Kadaba et al. |
| 10,086,999 | B2 | 10/2018 | Stadie et al. |
| 10,106,323 | B2 | 10/2018 | Terrill et al. |
| 10,189,641 | B2 | 1/2019 | Hognaland |
| 10,202,240 | B2 | 2/2019 | De Angelis |
| 10,345,818 | B2 | 7/2019 | Sibley |
| 10,427,872 | B2 | 10/2019 | Li |
| 10,430,756 | B2 | 10/2019 | Greenberg |
| 10,549,915 | B1 | 2/2020 | Theobald |
| 10,689,195 | B2 | 6/2020 | Collin et al. |
| 10,745,164 | B2 | 8/2020 | Prahlad et al. |
| 10,961,054 | B2 | 3/2021 | Gravelle et al. |
| 2002/0121521 | A1 | 9/2002 | Beal et al. |
| 2003/0208902 | A1 | 11/2003 | Sanders et al. |
| 2003/0212602 | A1 | 11/2003 | Schaller |
| 2003/0228196 | A1 | 12/2003 | Satchwell et al. |
| 2004/0010337 | A1 | 1/2004 | Mountz |
| 2004/0153379 | A1 | 8/2004 | Joyce et al. |
| 2005/0043850 | A1 | 2/2005 | Stevens et al. |
| 2005/0047895 | A1 | 3/2005 | Lert, Jr. |
| 2005/0055260 | A1 | 3/2005 | Yamamoto |
| 2005/0209731 | A1 | 9/2005 | Penkar et al. |
| 2005/0241129 | A1 | 11/2005 | Naumann et al. |
| 2006/0038010 | A1 | 2/2006 | Lucas |
| 2006/0085235 | A1 | 4/2006 | Nguyen et al. |
| 2006/0085296 | A1 | 4/2006 | Strickland |
| 2006/0111989 | A1 | 5/2006 | Church et al. |
| 2006/0158043 | A1 | 7/2006 | Brouwer et al. |
| 2006/0228196 | A1 | 10/2006 | Li |
| 2007/0059132 | A1 | 3/2007 | Akamatsu |
| 2007/0188322 | A1 | 8/2007 | English et al. |
| 2008/0131241 | A1 | 6/2008 | King |
| 2008/0301068 | A1 | 12/2008 | Fager et al. |
| 2008/0314981 | A1 | 12/2008 | Eisenson |
| 2009/0185884 | A1 | 7/2009 | Wurman et al. |

(56) References Cited

U.S. PATENT DOCUMENTS

| | | |
|---|---|---|
| 2010/0138037 A1 | 6/2010 | Adelberg et al. |
| 2011/0238207 A1 | 9/2011 | Bastian et al. |
| 2012/0030070 A1 | 2/2012 | Keller et al. |
| 2012/0118845 A1 | 5/2012 | Wada |
| 2012/0197431 A1 | 8/2012 | Toebes et al. |
| 2012/0233028 A1 | 9/2012 | Brown et al. |
| 2012/0272500 A1 | 11/2012 | Reuteler |
| 2012/0290125 A1 | 11/2012 | Perry |
| 2012/0321423 A1 | 12/2012 | Macknight et al. |
| 2013/0080454 A1 | 3/2013 | Raghunathan et al. |
| 2013/0181586 A1 | 7/2013 | Hognaland |
| 2013/0245810 A1 | 9/2013 | Sullivan et al. |
| 2013/0325159 A1 | 12/2013 | Kilibarda et al. |
| 2013/0343843 A1 | 12/2013 | Venkataraman et al. |
| 2013/0343844 A1 | 12/2013 | Fosnight et al. |
| 2014/0100715 A1* | 4/2014 | Mountz ............... B65G 1/1378 701/2 |
| 2014/0100998 A1* | 4/2014 | Mountz ................. G06Q 10/08 705/28 |
| 2014/0100999 A1* | 4/2014 | Mountz ............... G06Q 10/087 705/28 |
| 2014/0271069 A1 | 9/2014 | Salichs et al. |
| 2014/0277693 A1 | 9/2014 | Naylor |
| 2014/0279294 A1 | 9/2014 | Field-Darragh et al. |
| 2015/0046364 A1 | 2/2015 | Kriss |
| 2015/0052019 A1 | 2/2015 | Field-Darragh et al. |
| 2015/0071743 A1 | 3/2015 | Lert |
| 2015/0088302 A1 | 3/2015 | Mountz et al. |
| 2015/0127143 A1 | 5/2015 | Lindbo et al. |
| 2015/0151912 A1 | 6/2015 | Mountz et al. |
| 2015/0225187 A1 | 8/2015 | Razumov |
| 2015/0291357 A1 | 10/2015 | Razumov |
| 2016/0042315 A1 | 2/2016 | Field-Darragh et al. |
| 2016/0129587 A1 | 5/2016 | Lindbo et al. |
| 2016/0130086 A1 | 5/2016 | Yamashita |
| 2016/0137418 A1 | 5/2016 | Traversa et al. |
| 2016/0140488 A1 | 5/2016 | Lindbo |
| 2016/0167888 A1 | 6/2016 | Messina |
| 2016/0194151 A1 | 7/2016 | Lindbo et al. |
| 2016/0283898 A1 | 9/2016 | Reuther et al. |
| 2016/0347545 A1 | 12/2016 | Lindbo et al. |
| 2016/0355337 A1 | 12/2016 | Lert et al. |
| 2016/0355339 A1 | 12/2016 | Peng |
| 2017/0086011 A1 | 3/2017 | Neves et al. |
| 2017/0129703 A1 | 5/2017 | Lindbo et al. |
| 2017/0140327 A1 | 5/2017 | Lindbo |
| 2017/0152106 A1 | 6/2017 | Hofmann |
| 2017/0166400 A1 | 6/2017 | Hofmann |
| 2017/0217681 A1 | 8/2017 | Tai |
| 2017/0256428 A1 | 9/2017 | Kawamura |
| 2017/0305668 A1 | 10/2017 | Bestic et al. |
| 2017/0313514 A1 | 11/2017 | Lert et al. |
| 2017/0323250 A1 | 11/2017 | Lindbo et al. |
| 2017/0369246 A1 | 12/2017 | Dewitt et al. |
| 2018/0025460 A1 | 1/2018 | Watanabe et al. |
| 2018/0036845 A1 | 2/2018 | Thorwarth et al. |
| 2018/0037412 A1 | 2/2018 | Lynch et al. |
| 2018/0039282 A1 | 2/2018 | Gupta et al. |
| 2018/0053148 A1 | 2/2018 | Nelson, Jr. |
| 2018/0093828 A1 | 4/2018 | Lindbo et al. |
| 2018/0127212 A1* | 5/2018 | Jarvis .................... G05D 1/247 |
| 2018/0128532 A1 | 5/2018 | Hognaland |
| 2018/0134492 A1 | 5/2018 | Lert |
| 2018/0148259 A1 | 5/2018 | Gravelle et al. |
| 2018/0150793 A1 | 5/2018 | Lert et al. |
| 2018/0162639 A1 | 6/2018 | Ingram-Tedd et al. |
| 2018/0170650 A1 | 6/2018 | Lindbo et al. |
| 2018/0194556 A1 | 7/2018 | Lert et al. |
| 2018/0215543 A1 | 8/2018 | Lert et al. |
| 2018/0216342 A1 | 8/2018 | Lert |
| 2018/0218320 A1 | 8/2018 | Lee et al. |
| 2018/0218469 A1 | 8/2018 | Lert et al. |
| 2018/0247257 A1 | 8/2018 | Lert et al. |
| 2018/0257863 A1 | 9/2018 | Lert |
| 2018/0290831 A1 | 10/2018 | Wolf et al. |
| 2018/0305122 A1 | 10/2018 | Moulin et al. |
| 2018/0305123 A1 | 10/2018 | Lert et al. |
| 2018/0319590 A1 | 11/2018 | Lindbo et al. |
| 2018/0322444 A1 | 11/2018 | Todeschini |
| 2018/0335502 A1 | 11/2018 | Lowe et al. |
| 2018/0341908 A1 | 11/2018 | Lert et al. |
| 2018/0346243 A1 | 12/2018 | Lindbo et al. |
| 2019/0027591 A1 | 1/2019 | Naito |
| 2019/0168964 A1 | 6/2019 | Lert |
| 2019/0176323 A1 | 6/2019 | Coady et al. |
| 2019/0194971 A1 | 6/2019 | Shinnaka et al. |
| 2019/0198370 A1 | 6/2019 | Abe et al. |
| 2019/0233213 A1 | 8/2019 | Phan-Quiroga et al. |
| 2020/0024114 A1 | 1/2020 | Uchimura et al. |
| 2020/0031576 A1 | 1/2020 | Lert et al. |
| 2020/0071076 A1 | 3/2020 | Fosnight et al. |
| 2020/0302391 A1 | 9/2020 | Li et al. |
| 2021/0253348 A1 | 8/2021 | Austrheim |
| 2021/0261336 A1* | 8/2021 | Ingram-Tedd ....... B65G 1/0464 |
| 2021/0395012 A1* | 12/2021 | Liu ...................... B65G 1/1371 |

FOREIGN PATENT DOCUMENTS

| | | |
|---|---|---|
| CA | 2077165 C | 4/1993 |
| CA | 2673932 A1 | 7/2008 |
| CA | 2795022 A1 | 10/2011 |
| CA | 2872496 A1 | 10/2013 |
| CA | 2885984 A1 | 5/2014 |
| CA | 2890843 A1 | 6/2014 |
| CA | 2846273 A1 | 9/2014 |
| CA | 2920361 A1 | 12/2014 |
| CA | 2942445 A1 | 9/2015 |
| CA | 2944332 A1 | 10/2015 |
| CA | 2953028 A1 | 12/2015 |
| CN | 1452105 A | 10/2003 |
| CN | 204612307 U | 9/2015 |
| CN | 106029529 A | 10/2016 |
| CN | 106185152 A | 12/2016 |
| CN | 107466203 A | 12/2017 |
| CN | 107922115 A | 4/2018 |
| CN | 108349652 A | 7/2018 |
| CN | 108430890 A | 8/2018 |
| CN | 108502431 A | 9/2018 |
| CN | 110065750 A | 7/2019 |
| CN | 110356752 A | 10/2019 |
| CN | 111661538 A | 9/2020 |
| DE | 10011205 A1 | 9/2001 |
| DE | 102009017241 A1 | 10/2010 |
| DE | 102017222801 A1 | 6/2019 |
| EP | 0071883 A1 | 12/1986 |
| EP | 0262526 A2 | 4/1988 |
| EP | 0599032 A1 | 1/1994 |
| EP | 1452462 A2 | 9/2004 |
| EP | 2121204 A2 | 11/2009 |
| EP | 3056453 A1 | 8/2016 |
| EP | 3385893 A1 | 10/2018 |
| EP | 3166876 B1 | 11/2018 |
| FR | 2614609 A1 | 11/1988 |
| GB | 1432224 A | 4/1973 |
| GB | 2419977 A | 10/2006 |
| GB | 2461722 A | 1/2010 |
| GB | 2542651 A | 3/2017 |
| GB | 2544348 A | 5/2017 |
| GB | 2544649 A | 5/2017 |
| GB | 2544650 A | 5/2017 |
| GB | 2565883 A | 2/2019 |
| JP | S56-155362 A | 12/1981 |
| JP | S61-256799 A | 11/1986 |
| JP | S62-222901 A | 9/1987 |
| JP | H01-133802 A | 5/1989 |
| JP | H03-143802 A | 6/1991 |
| JP | H05-224606 A | 9/1993 |
| JP | H06-20930 B2 | 3/1994 |
| JP | H06-305353 A | 11/1994 |
| JP | 2000-327111 A | 11/2000 |
| JP | 2002-032449 A | 1/2002 |
| JP | 2002-056308 A | 2/2002 |
| JP | 3271509 B2 | 4/2002 |
| JP | 2002-269417 A | 9/2002 |

(56) References Cited

FOREIGN PATENT DOCUMENTS

| | | | |
|---|---|---|---|
| JP | 2003-341810 A | 12/2003 |
| JP | 2004-323169 A | 11/2004 |
| JP | 2005-177905 A | 7/2005 |
| JP | 2005-519828 A | 7/2005 |
| JP | 2006-176304 A | 7/2006 |
| JP | 2007-246226 A | 9/2007 |
| JP | 2010-235212 A | 10/2010 |
| JP | 2013-256371 A | 12/2013 |
| JP | 2014-503924 A | 2/2014 |
| JP | 5562646 B2 | 7/2014 |
| JP | 2015-087964 A | 5/2015 |
| JP | 2015-518591 A | 7/2015 |
| JP | 2015-157687 A | 9/2015 |
| JP | 2015-199563 A | 11/2015 |
| JP | 2016-055963 A | 4/2016 |
| JP | 2016-525053 A | 8/2016 |
| JP | 2016-525490 A | 8/2016 |
| JP | 2016-533999 A | 11/2016 |
| JP | 2017-512166 A | 5/2017 |
| JP | 2017-206352 A | 11/2017 |
| JP | 2018-502388 A | 1/2018 |
| JP | 6271509 B2 | 1/2018 |
| JP | 2018-512076 A | 5/2018 |
| JP | 2018-517646 A | 7/2018 |
| JP | 2018-526701 A | 9/2018 |
| JP | 2019-008678 A | 1/2019 |
| KR | 10-1289249 B1 | 1/2013 |
| KR | 101489337 B1 | 2/2015 |
| KR | 10-2016-0040690 A | 4/2016 |
| KR | 10-2018-0063315 A | 6/2018 |
| KR | 10-2018-0081740 A | 7/2018 |
| NO | 20181005 A1 | 12/2019 |
| TW | 201328951 A | 7/2013 |
| WO | WO 2000/068859 A2 | 5/2000 |
| WO | WO 2003/060752 A1 | 1/2003 |
| WO | WO 2003/079153 A2 | 9/2003 |
| WO | WO 2007/011814 A2 | 1/2007 |
| WO | WO 2007/068406 A1 | 6/2007 |
| WO | WO 2011/150131 A1 | 12/2011 |
| WO | WO 2012/083060 A1 | 6/2012 |
| WO | WO 2012/122090 A1 | 9/2012 |
| WO | WO 2013/142106 A1 | 9/2013 |
| WO | WO 2013/155107 A1 | 10/2013 |
| WO | WO 2014/022791 A1 | 2/2014 |
| WO | WO 2014/055716 A1 | 4/2014 |
| WO | WO 2014/090684 A1 | 6/2014 |
| WO | WO 2014/203126 A1 | 12/2014 |
| WO | WO 2015/019055 A1 | 2/2015 |
| WO | WO 2015/042587 A2 | 3/2015 |
| WO | WO 2015/052830 A1 | 4/2015 |
| WO | WO 2015/124610 A1 | 8/2015 |
| WO | WO 2015/134529 A1 | 9/2015 |
| WO | WO 2015/185628 A2 | 12/2015 |
| WO | WO 2015/197696 A1 | 12/2015 |
| WO | WO 2016/183541 A1 | 5/2016 |
| WO | WO 2016/100045 A1 | 6/2016 |
| WO | WO 2016/112037 A1 | 7/2016 |
| WO | WO 2016/130222 A1 | 8/2016 |
| WO | WO 2016/166323 A1 | 10/2016 |
| WO | WO 2016/172253 A1 | 10/2016 |
| WO | WO 2016/172793 A1 | 11/2016 |
| WO | WO 2016/173445 A1 | 11/2016 |
| WO | WO 2016/196815 A1 | 12/2016 |
| WO | WO 2016/198467 A1 | 12/2016 |
| WO | WO 2017/097724 A1 | 6/2017 |
| WO | WO 2017/108383 A1 | 6/2017 |
| WO | WO 2017/121512 A1 | 7/2017 |
| WO | WO 2017/197121 A1 | 11/2017 |
| WO | WO 2017/211596 A1 | 12/2017 |
| WO | WO 2017/211640 A1 | 12/2017 |
| WO | WO 2018/033426 A1 | 2/2018 |
| WO | WO 2018/069282 A1 | 4/2018 |
| WO | WO 2018/072924 A1 | 4/2018 |
| WO | WO 2018/094286 A1 | 5/2018 |
| WO | WO 2018/102444 A1 | 6/2018 |
| WO | WO 2018/132500 A1 | 7/2018 |
| WO | WO 2018/144622 A1 | 8/2018 |
| WO | WO 2018/144625 A1 | 8/2018 |
| WO | WO 2018/144626 A1 | 8/2018 |
| WO | WO 2018/156966 A1 | 8/2018 |
| WO | WO 2018/162757 A1 | 9/2018 |
| WO | WO 2018/187308 A1 | 10/2018 |
| WO | WO 2018/195200 A1 | 10/2018 |
| WO | WO 2019/000106 A1 | 1/2019 |
| WO | WO 2019/001816 A1 | 1/2019 |
| WO | WO 2019/094511 A1 | 5/2019 |
| WO | WO 2019/141877 A1 | 7/2019 |
| WO | WO 2019/145237 A2 | 8/2019 |
| WO | WO 2019/197497 A1 | 10/2019 |
| WO | WO 2019/232613 A1 | 12/2019 |
| WO | WO 2019/232651 A1 | 12/2019 |
| WO | WO 2019/232652 A1 | 12/2019 |
| WO | WO 2019/238641 A1 | 12/2019 |
| WO | WO 2019/238645 A2 | 12/2019 |
| WO | WO 2019/238664 A1 | 12/2019 |
| WO | WO 2019/238698 A1 | 12/2019 |
| WO | WO 2019/243549 A1 | 12/2019 |
| WO | WO 2020/006010 A1 | 1/2020 |
| WO | WO 2020/178692 A1 | 9/2020 |
| WO | WO 2020/183427 A1 | 9/2020 |
| WO | WO 2020/229973 A1 | 11/2020 |
| WO | WO 2020/250166 A1 | 12/2020 |
| WO | WO 2021/038437 A1 | 3/2021 |
| WO | WO 2021/108899 A1 | 6/2021 |

OTHER PUBLICATIONS

International Preliminary Report on Patentability issued in application No. PCT/CA2020/051641 on May 17, 2022.
International Search Report issued in application No. PCT/CA2020/051641 on Feb. 15, 2021.
Aized, "Materials handling in flexible manufacturing systems", Future Manufacturing Systems, Aug. 17, 2010, pp. 121-136.
Alicke et al., "Supply Chain 4.0 - the next-generation digital supply chain", Supply Chain Management, McKinsey & Company, Jun. 2016, 16 pages.
"Consolidation to Free up Storage Bins / Bulk Bin Consolidation", SAP, Extended Warehouse Management, Feb. 2020, 3 pages.
Dematic RapidStore ASRS, Dematic, Apr. 2016, 20 pages.
Dittmer et al. "The Intelligent Container as a Part of the Internet of Things", Proceedings of the 2012 IEEE International Conference on Cyber Technology in Automation, Control and Intelligent Systems, May 27-31, 2012, Bankok, Thailand, pp. 209-214.
Exotec | Our Projects - Site Specificity | Cdiscount, Document D3 in in Pre-Grant Opposition by Third Party filed on Jun. 8, 2023 in respect of Indian Patent Application No. IN202147055222, 5 pages.
Ferguson, M., "What We Like This Week: Bricks, Bots, and Better Architecture", Autodesk, Jul. 27, 2018, 2 pages.
"KANBAN", Wikipedia: The Free Encyclopedia, Wikimedia Foundation, http://en.wikipedia.org/wiki/kanban, accessed on Feb. 26, 2019.
Penske, "Streamline the returnable container process", https://wwwwww.penskelogistics.com/technology wimprove-efficiency/streamline-container-process/ accessed on Dec. 4, 2024, 6 pages.
Robinson, "How Supply Chain Systems Integration is a Game Changer", Industry Week, Jul. 3, 2018, 9 pages.
Schrauf et al., "How Digitization Makes the Supply Chain More Efficient, Agile, and Customer- focused", Strategy& —Industry 4.0, 2016, 32 pages.
Twede, D., et al. "Cartons, Crates and Corrugated Board", Handbook of Paper and Wood Packaging Technology, 2nd edition, DEStech Publications, Inc., 2015, 585 pages.
Vogt et al. "Explorative Investigation of Application Scenarios for Smart Bin Systems", International Conference on Competitive Manufacturing Proceedings, Jan. 30, 2019, Stellenbosch, South Africa, pp. 124-130.
Witron, "'All-in-one —Order Fulfillment at a new level", https://www.witron.de/en/aio-all-in-one.html, accessed on Dec. 4, 2024, 6 pages.

(56)　　　　　　References Cited

OTHER PUBLICATIONS

Yornew, Cim and FMS Systems, http://www.vornew.com/en/sim. asp, accessed on Dec. 4, 2024, 5 pages.

International Search Report and Written Opinion mailed Oct. 23, 2020 for PCT Application No. PCT/IB2020/055479, filed Jun. 11, 2020, in 10 pages.

International Preliminary Report on Patentability mailed Dec. 14, 2021 for PCT Application No. PCT/IB2020/055479, filed Jun. 11, 2020, in 6 pages.

* cited by examiner

AUTOMATED STORAGE AND RETRIEVAL SYSTEM REDUCING BIN MOVES BY SELECTING MULTI-STOCK BINS CONTAINING HIGHEST NUMBER OF SKUS ON WORKSTATION STOCK WAITLIST

CROSS-REFERENCE TO RELATED APPLICATIONS

This application is a national stage application of the Patent Cooperation Treaty (PCT) international application titled "AUTOMATED STORAGE AND RETRIEVAL SYS-TEM REDUCING BIN MOVES BY SELECTING MULTI-STOCK BINS CONTAINING HIGHEST NUMBER OF SKUS ON WORKSTATION STOCK WAITLIST", international application number PCT/CA2020/051641, filed in the Receiving Office of the Canadian Patent and Trademark Office on Nov. 30, 2020, which claims the benefit of priority of U.S. Provisional Application No. 62/943,049 filed Dec. 3, 2019 and U.S. Provisional Application No. 63/118,860 filed Nov. 27, 2020, which are both incorporated herein by reference.

BACKGROUND OF THE INVENTION

(1) Field of the Invention

The invention pertains generally to an automated storage and retrieval system (ASRS) for warehouses in e-commerce applications, retail stock replenishment, supply chain man-agement, inventory management and other similar fields. More specifically, the invention relates to an automated storage and retrieval system that dynamically selects retrieval of optimal multi-stock bins for delivery to a picking workstation in order to maximize items picked per bin presentation at the workstation.

(2) Description of the Related Art

In typical order-picking systems operating according to the principle of goods-to-picker (G2P), bins containing stock are fetched from a warehouse and delivered to one of a plurality of picking workstations. Employees of the ware-house remain at their respective workstations and pick items from the bins in order to work toward fulfilling orders.

Because an order may include multiple unique stock-keeping units (SKUs) that are not stored together in a same source bin in the warehouse combined with the fact that traditional systems cannot deliver different bins just in time to workstations right when they are needed, an order is often not completely processed at a single picking station. Instead, a plurality of bins required to fulfil the order are fetched to different workstations in parallel and respective sub-orders for picking individuals one of the required SKUs are sent to the various workstations. In this way, different SKUs for a single order are picked at different workstations and are thereafter sorted into a single package for shipping. Further-more, many traditional systems store only a single SKU per bin and consequently wait until multiple items from multiple orders can be batch picked together to increase efficiency. This increases each order processing time and relies on a downstream sortation system to buffer all orders until all line items are collected. The expediency of order assembly is dictated by efficiency, rather than order priority or hold time.

To increase efficiency, the orders may be processed in sequential waves, where each wave includes a batch of orders, such as sixty customer orders, split into sub-orders and sent to the workstations for picking during the wave. The picked items from all workstations during a single wave are sorted into their respective completed orders ready for packing and shipping. The batch size of the waves is typically dependent on the sortation system as the sortation system will have a limit on the number of distinct finished-order groups. The sortation may be done in an automatic fashion by placing all picked articles from the workstations during a single wave onto a conveyer belt. The conveyer belt moves the various picked items to an automated sortation system, which physically arranges the individual items into groups that match the customer orders and are thereby ready for packing and shipping to customers. After one wave of orders finishes, another wave starts.

As more and more people shop online, the number of picking orders to be processed each day in e-commerce fulfilment centers is steadily rising. However, the orders are often smaller in terms of items per order despite the total numbers of ordered SKUs increasing each day. Many smaller orders to be processed with a broad spectrum of articles means many bin retrievals are required to pick the items. Particularly in the field of e-commerce, the above-described typical order-picking system may not be able to keep up with customer orders or meet customer demands.

E-commerce orders placed over the Internet must take place within a relatively short period of time in order to be commercially competitive. Because of the large number of SKUs from which an order may be selected, the inventory warehouse may have a large footprint. Bin retrievals, even when automated by robots, take a relatively long time to perform, slowing the ability of the order picking system in finishing orders of a particular batch of orders. If new orders start to arrive faster than the automated storage and retrieval system can process the current batch of orders, the system will fall behind and customer expectations for delivery times of the new orders will not be met.

Even in the event that the system does not fall behind, the above-described system may still encounter problems. For example, processing pending orders in waves where an entire batch of orders (e.g., sixty orders) in the wave needs to be completed before any new pending orders can be processed negatively impacts the system's ability to handle rush orders. Each wave takes time to complete. In the event a rush order arrives after a wave of orders has been sent to the picking workstations, the system either needs to wait for the orders in the current wave to be fully processed, or the current wave needs to be canceled. Either option greatly reduces overall system performance.

BRIEF SUMMARY OF THE INVENTION

According to an exemplary embodiment of the invention there is disclosed an automated storage and retrieval system. The system includes a bin storage facility having a plurality of bins physically stored therein, a plurality of the bins in the bin storage facility being multi-stock bins that hold stock for a plurality of different stock-keeping units (SKUs). The system further includes a data storage device having a plurality of records electronically stored therein, the records indicating a particular one or more stock-keeping units (SKUs) for which there is stock in each bin. The system further includes a workstation at which a picking agent picks stock from one or more bins of the bin storage facility delivered to the workstation in order to fulfil one or more current orders assigned to the workstation. The system further includes a robot for fetching one or more bins from the bin storage facility and delivering the one or more bins to the workstation. The system further includes a controller configured to track a stock waitlist for the workstation, the stock waitlist indicating quantities of one or more required stock-keeping units (SKUs) still required to be delivered to the workstation in order to fulfil the one or more current orders assigned to the workstation. The controller is further configured to select a bin of the bin storage facility as a selected bin, the selected bin being a multi-stock bin that according to the records contains stock for a highest number of unique ones of the required stock-keeping units (SKUs) indicated on the stock waitlist. The controller is further configured to send a command to the robot to fetch the selected bin from the bin storage facility and deliver the selected bin to the workstation. The controller is further configured to update the stock waitlist for the workstation by removing each of the required stock-keeping units (SKUs) for which there is sufficient stock included in the selected bin.

According to an exemplary embodiment of the invention there is disclosed a controller of an automated storage and retrieval system. The controller includes one or more processors that are configured by executing software loaded from a storage medium to store a plurality of records indicating a particular one or more stock-keeping units (SKUs) for which there is stock in each bin of a bin storage facility having a plurality of bins physically stored therein, a plurality of the bins in the bin storage facility being multi-stock bins that hold stock for a plurality of different stock-keeping units (SKUs). The processors are further configured to track a stock waitlist for a workstation, the stock waitlist indicating quantities of one or more required stock-keeping units (SKUs) still required to be delivered to the workstation in order to fulfil the one or more current orders assigned to the workstation, the workstation being a location at which a picking agent picks stock from one or more bins of the bin storage facility delivered to the workstation in order to fulfil one or more current orders assigned to the workstation. The processors are further configured to select a bin of the bin storage facility as a selected bin, the selected bin being a multi-stock bin that according to the records contains stock for a highest number of unique ones of the required stock-keeping units (SKUs) indicated on the stock waitlist. The processors are further configured to send a command to a robot to fetch the selected bin from the bin storage facility and deliver the selected bin to the workstation. The processors are further configured to update the stock waitlist for the workstation by removing each of the required stock-keeping units (SKUs) for which there is sufficient stock included in the selected bin.

According to an exemplary embodiment of the invention there is disclosed a controller of an automated storage and retrieval system. The controller includes means for storing a plurality of records indicating a particular one or more stock-keeping units (SKUs) for which there is stock in each bin of a bin storage facility having a plurality of bins physically stored therein, a plurality of the bins in the bin storage facility being multi-stock bins that hold stock for a plurality of different stock-keeping units (SKUs). The controller further includes means for tracking a stock waitlist for a workstation, the stock waitlist indicating quantities of one or more required stock-keeping units (SKUs) still required to be delivered to the workstation in order to fulfil the one or more current orders assigned to the workstation, the workstation being a location at which a picking agent picks stock from one or more bins of the bin storage facility delivered to the workstation in order to fulfil one or more current orders assigned to the workstation. The controller further includes means for selecting a bin of the bin storage facility as a selected bin, the selected bin being a multi-stock bin that according to the records contains stock for a highest number of unique ones of the required stock-keeping units (SKUs) indicated on the stock waitlist. The controller further includes means for sending a command to a robot to fetch the selected bin from the bin storage facility and deliver the selected bin to the workstation. The controller further includes means for updating the stock waitlist for the workstation by removing each of the required stock-keeping units (SKUs) for which there is sufficient stock included in the selected bin.

According to an exemplary embodiment of the invention there is disclosed a non-transitory processor-readable medium comprising processor executable instructions that when executed by one or more processors cause the one or more processors to store a plurality of records indicating a particular one or more stock-keeping units (SKUs) for which there is stock in each bin of a bin storage facility having a plurality of bins physically stored therein, a plurality of the bins in the bin storage facility being multi-stock bins that hold stock for a plurality of different stock-keeping units (SKUs); track a stock waitlist for a workstation, the stock waitlist indicating quantities of one or more required stock-keeping units (SKUs) still required to be delivered to the workstation in order to fulfil the one or more current orders assigned to the workstation, the workstation being a location at which a picking agent picks stock from one or more bins of the bin storage facility delivered to the workstation in order to fulfil one or more current orders assigned to the workstation; select a bin of the bin storage facility as a selected bin, the selected bin being a multi-stock bin that according to the records contains stock for a highest number of unique ones of the required stock-keeping units (SKUs) indicated on the stock waitlist; send a command to a robot to fetch the selected bin from the bin storage facility and deliver the selected bin to the workstation; and update the stock waitlist for the workstation by removing each of the required stock-keeping units (SKUs) for which there is sufficient stock included in the selected bin.

According to an exemplary embodiment of the invention there is disclosed a method of controlling a robot in an automated storage and retrieval system. The method includes storing a plurality of records indicating a particular one or more stock-keeping units (SKUs) for which there is stock in each bin of a bin storage facility having a plurality of bins physically stored therein, a plurality of the bins in the bin storage facility being multi-stock bins that hold stock for a plurality of different stock-keeping units (SKUs). The method further includes tracking a stock waitlist for the workstation, the stock waitlist indicating quantities of one or more required stock-keeping units (SKUs) still required to be delivered to a workstation in order to fulfil the one or more current orders assigned to the workstation, the workstation being a location at which a picking agent picks stock from one or more bins of the bin storage facility delivered to the workstation in order to fulfil one or more current orders assigned to the workstation. The method further includes selecting a bin of the bin storage facility as a selected bin, the selected bin being a multi-stock bin that according to the records contains stock for a highest number of unique ones of the required stock-keeping units (SKUs) indicated on the stock waitlist. The method further includes sending a command to a robot to fetch the selected bin from the bin storage facility and deliver the selected bin to the workstation. The method further includes updating the stock waitlist for the workstation by removing each of the required stock-keeping units (SKUs) for which there is sufficient stock included in the selected bin.

In some embodiments, a warehouse controller tracks the contents of multi-SKU bins of inventory in a storage facility and continually calculates the best incoming orders to group together and assign to different picking workstations as conditions change and new orders are received that impact the processing priority. The controller further continually calculates next bins that should be retrieved as robots become available to increase items picked per bin presentation at each workstation.

According to an exemplary embodiment of the invention there is disclosed a system for order batching and bin selection for optimizing item picking from an automated storage and retrieval system (ASRS). The system delivers bins to workstations just in time, grouped by order, in specific sequences, thereby executing discrete, just in time, batch order picking using multi-order workstations, advanced bin selection, and advanced order batching. The system optimizes the items picked per bin presentation (IPP) with or without the need for sortation systems. The system comprises a workstation including a pick port for presenting bins selected for fulfilling multi-orders (without the need for sortation) and single orders. In an embodiment, the workstation is a multi-order workstation. The workstation allows numerous multi-orders to be opened and grouped together to achieve the highest IPP, while appending complimentary single orders that increase the IPP. Each multi-order location includes a single tote to pick to a single order, which is assigned to the single tote. When a multi-order is assembled, the tote is closed and conveyed to packing, with a new order being assigned to the workstation to be assembled.

In some embodiments, the system increases the number of items picked every time a robot presents a bin to a workstation by expanding the order processing scope to include:

a) Order batching IPP gains, where the order processing queue and order assignment are prioritized to workstations considering the IPP gain of each order in the queue when processing alongside open orders at each workstation; and b) Bin selection IPP gain, where bins are selected to fulfill an order based on maximum IPP gains by considering all open orders at a workstation and the contents of all bins in the ASRS.

In some embodiments, the system uses dynamic feedback loops to constantly verify the state of inventory in the bins to ensure that the most optimal bins are selected to maximize IPP at all times. In some embodiments, the IPP maximization is only done at certain times. The advanced bin selection algorithm works on both picking orders and decanting inventory into the system. Dynamic feedback loops are also used to constantly measure the effectiveness of opening each order in the processing queue at each workstation, to ensure that new orders opened at each workstation are producing the highest IPP when picked alongside orders already being worked on at each workstation.

In some embodiments that only implements bin selection, orders are assigned to workstations by priority. In these embodiments, the system assigns orders to workstations to ensure that the highest priority items are processed first always.

In some embodiments, for advanced order batching and bin selection, the system is used during order assignment to a workstation to maximize efficiency/performance while meeting service level agreements dictated by priority and hold time. In these embodiments, IPP, hold time, and priority are all considered to varying degrees, where each can be weighed depending on customer preference.

In some embodiments, the controller selects a combination of bins that together will fulfill orders assigned to a workstation with the minimum number of bin presentations to the workstation. In other words, the controller dynamically selects and commands robots to retrieve bins that will whittle down the stock waitlist for the workstation with minimum number of bins.

In some embodiments, the system does not utilize a batch window or waves. Instead, a warehouse controller combines all orders into a single pending order pool for waveless processing where the most favorable order is processed when an order put-spot becomes available at a workstation and/or a robot is available for bin deliver to the workstation. In some embodiments, the system maximizes items picked per bin presentation to increase worker productivity, while minimizing robot workloads allowing waveless order processing (host system sends orders to the system as they are received, as opposed to releasing them in waves). In some embodiments, the system's efficiency actually increases when the pending order queue is larger, which means the efficiency of the system increases as the system gets more backed up with pending orders awaiting processing.

In some embodiments, the system eliminates the sorting process by picking directly to the order location such as to a completed order tote.

These and other advantages and embodiments of the present invention will no doubt become apparent to those of ordinary skill in the art after reading the following detailed description of preferred embodiments illustrated in the various figures and drawings.

BRIEF DESCRIPTION OF THE DRAWINGS

The invention will be described in greater detail with reference to the accompanying drawings which represent preferred embodiments thereof.

DETAILED DESCRIPTION

Figure 1:
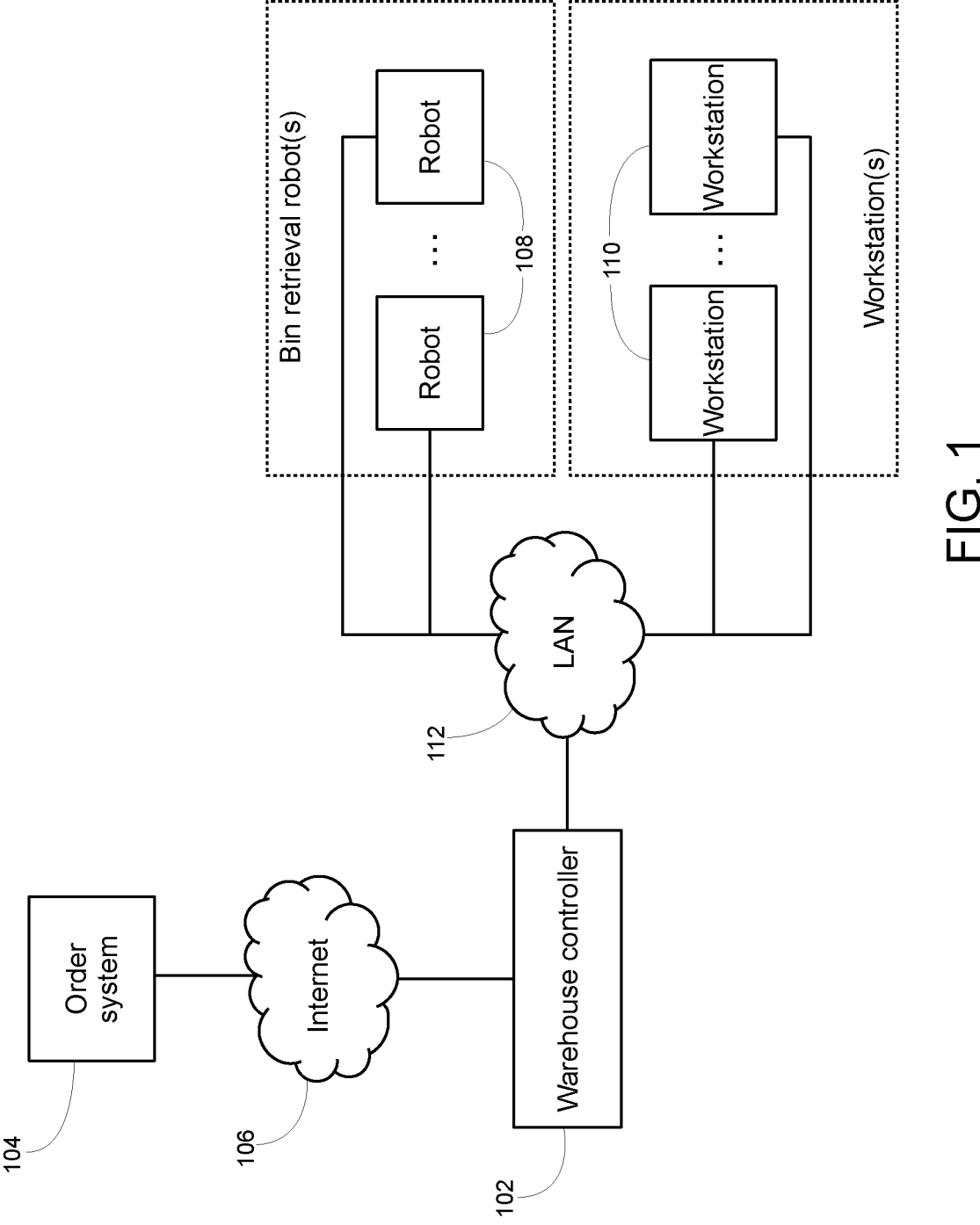
FIG. 1 shows a high-level block diagram of an automated storage and retrieval system (ASRS) according to an exemplary embodiment of the invention.

FIG. 1 shows a high-level block diagram of an automated storage and retrieval system (ASRS) 100 according to an exemplary embodiment of the invention. The system 100 includes a warehouse controller 102 coupled to an order system 104 via an external network 106 such as the Internet. The warehouse controller 102 is further coupled to one or more robots 108 and one or more picking workstations 110 via a local area network (LAN) 112 such as a wired and/or wireless network installed at the warehouse. Each of the robots 108 is for fetching one or more bins from a bin storage facility 114 and delivering the one or more bins to a particular one of the workstations 110. Picking agents such as employees at each workstation 110 pick stock from the bins delivered to the workstation 110 in order to fulfil one or more current orders assigned to the workstation 110.

Figure 2:
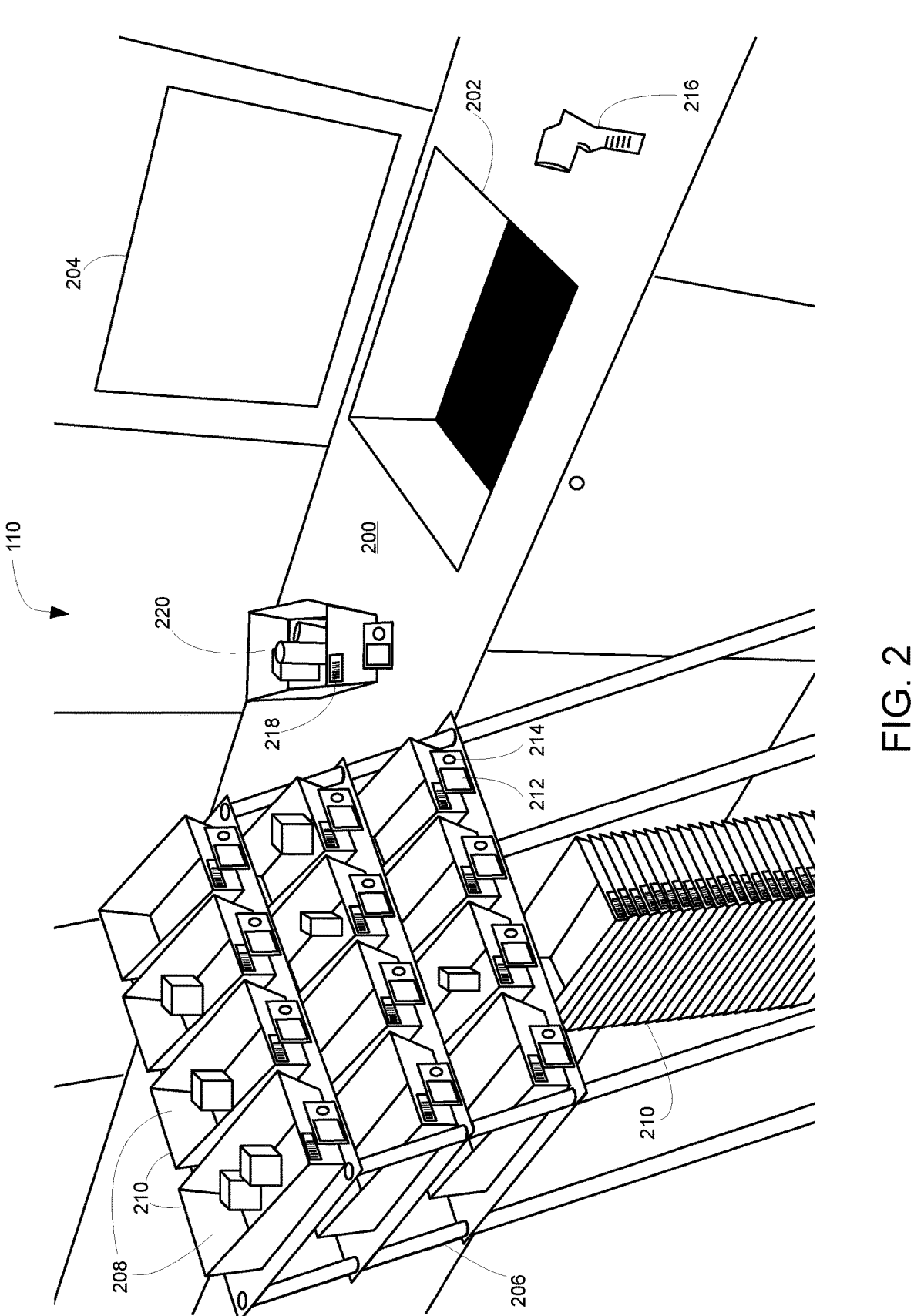
FIG. 2 illustrates a perspective view of one of the picking workstations of FIG. 1 according to an exemplary embodiment.

FIG. 2 illustrates a perspective view of one of the picking workstations 110 of FIG. 1 according to an exemplary embodiment. In this embodiment, the workstation 110 is positioned along a bench 200 that includes a picking port 202 passing through to a track under the bench 200. The robots 108 run along the track and present bins for presentation to a picking agent at the workstation 110 via the port 202. A display screen 204 with optional integrated speakers provides audiovisual instructions to the picking agent on which items to pick. The workstation 110 further includes a put-wall 206 that is formed by a plurality of twelve "multi" put-spots 208 with totes 210 in this embodiment. A plurality of unused totes 210 are located below the put-wall 206 ready for later usage by the picking agent when one of the twelve put-spots 208 has a completed order. Each put-spot 208 includes an electronic display 212 along with a button 214 with integrated light. The button 214 lights up when action is required by the picking agent related to that put-spot 208, and the electronic display 212 provides additional instructions such as the number of items to place in the tore 210.

Continuing the description of the elements of the workstation 110, a handheld wireless scanner device 216 is provided for scanning barcodes 218 on the totes. Each tote 210 has a unique barcode 218 in this embodiment. Additionally, there is an additional "singles" put-spot 220 on the bench in this embodiment.

In this embodiment, customer orders are picked directly to a single tote 210 and do not require additional sorting after the workstation 110. In other words, if a customer order contains multiple SKUs, stock for these different SKUs will all be picked at a single workstation 110 and all SKUs of the completed customer order will be gathered as a group in a "multi" tote 210 right at the workstation 110. The twelve put-spots 208 on the put-wall 206 in this embodiment correspond to twelve customer orders that each have multiple SKUs. These are referred to herein as multi-SKU orders. The singles put-spot 220 on the bench in this embodiment corresponds to a plurality of single-SKU orders, where each single-SKU order only include a single SKU in some quantity as ordered by a customer. Although items for different customer orders may be combined in a single tote 210 at the singles put-spot 220, the single orders do not require sorting either and go directly to packing since all items for each customer package are contained in the tote 210b.

Figure 3:
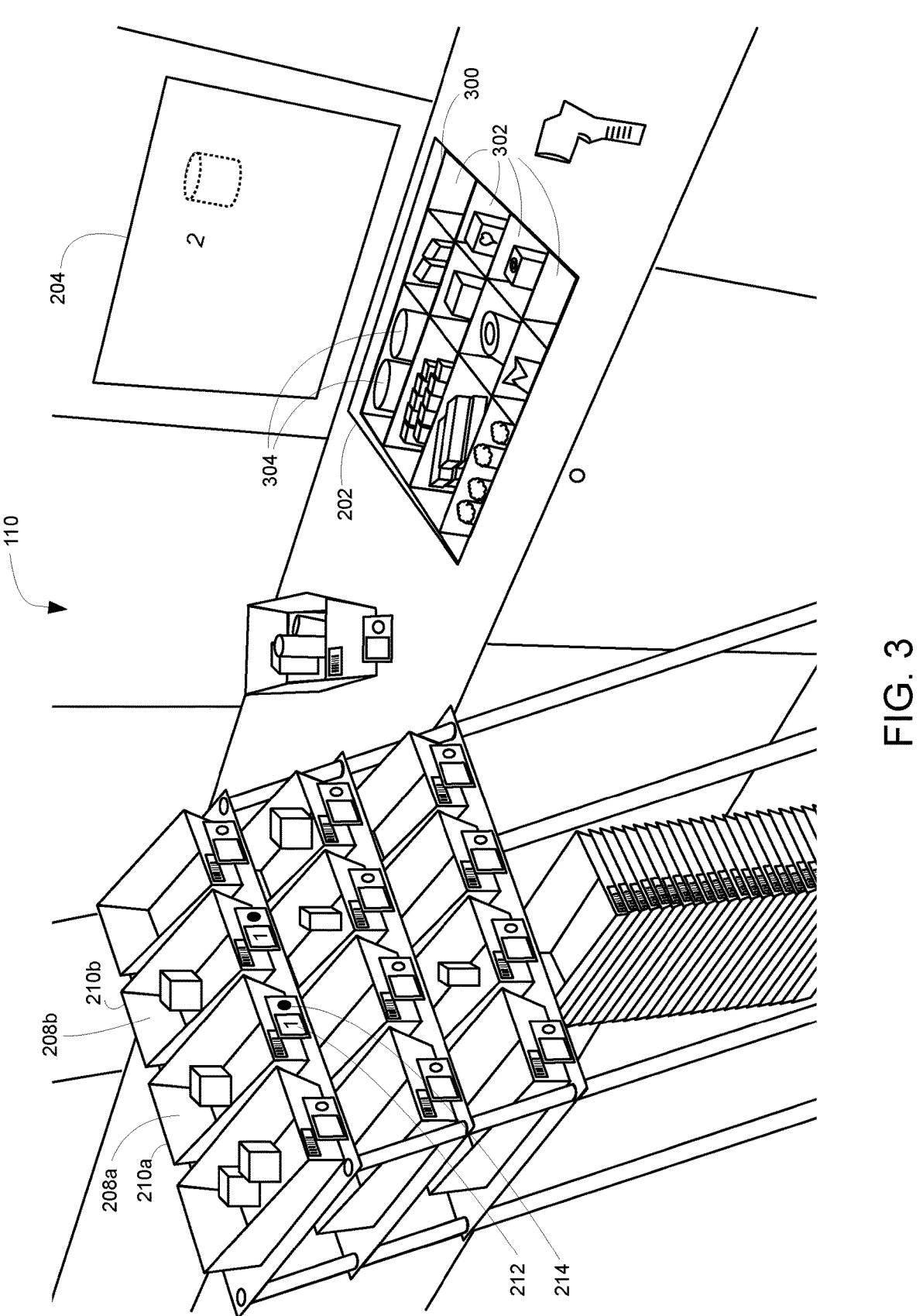
FIG. 3 illustrates the workstation of FIG. 2 immediately after arrival of a robot presenting a bin for picking.

FIGS. 3 to 6 show a sequence of perspective views illustrating an example picking process at the workstation 110 of FIG. 2 according to an exemplary embodiment. In particular, FIG. 3 illustrates the workstation 110 immediately after arrival of a robot 108 presenting a bin 300 for picking. As shown, the bin 300 is lifted by the robot 108 through the port 202 such that the picking agent can pick out items of stock through the top of the bin 300. The bin 300 in this example is subdivided into twelve individual compartments 302, and various different stock inventory is held in each compartment 302. In this example, the bin 300 retrieved by the robot 108 and brought to the workstation 110 is a multi-stock bin 300 that holds therein stock for a plurality of different product SKUs.

The display screen 204 instructs the picking agent on the quantity and shape of the items 304 to be picked first from the bin 300, and the put-spot displays 212 and buttons 214 on two specific put-spots 208a,b where the items are to be deposited are shown on the put-wall 206. Other indications such as lights and/or audio instructions may also instruct the picking agent on the item to pick and location to put. In this example, the display screen 204 instructs the user to pick two of a first item 304 from the bin 300 and the put location displays 212 instruct the user to put one of the items into a first tote 210a and another of the items into a second tote 210b. When the picking agent has placed an item 304 in a tote 210, the picking agent may press the button 214 on that tote 210's pick-spot 208 in order to provide feedback to the workstation 110 that the pick and put has been performed. Other sensors may be included in the workstation 110 to verify the pick and put are done properly in other embodiments.

Figure 4:
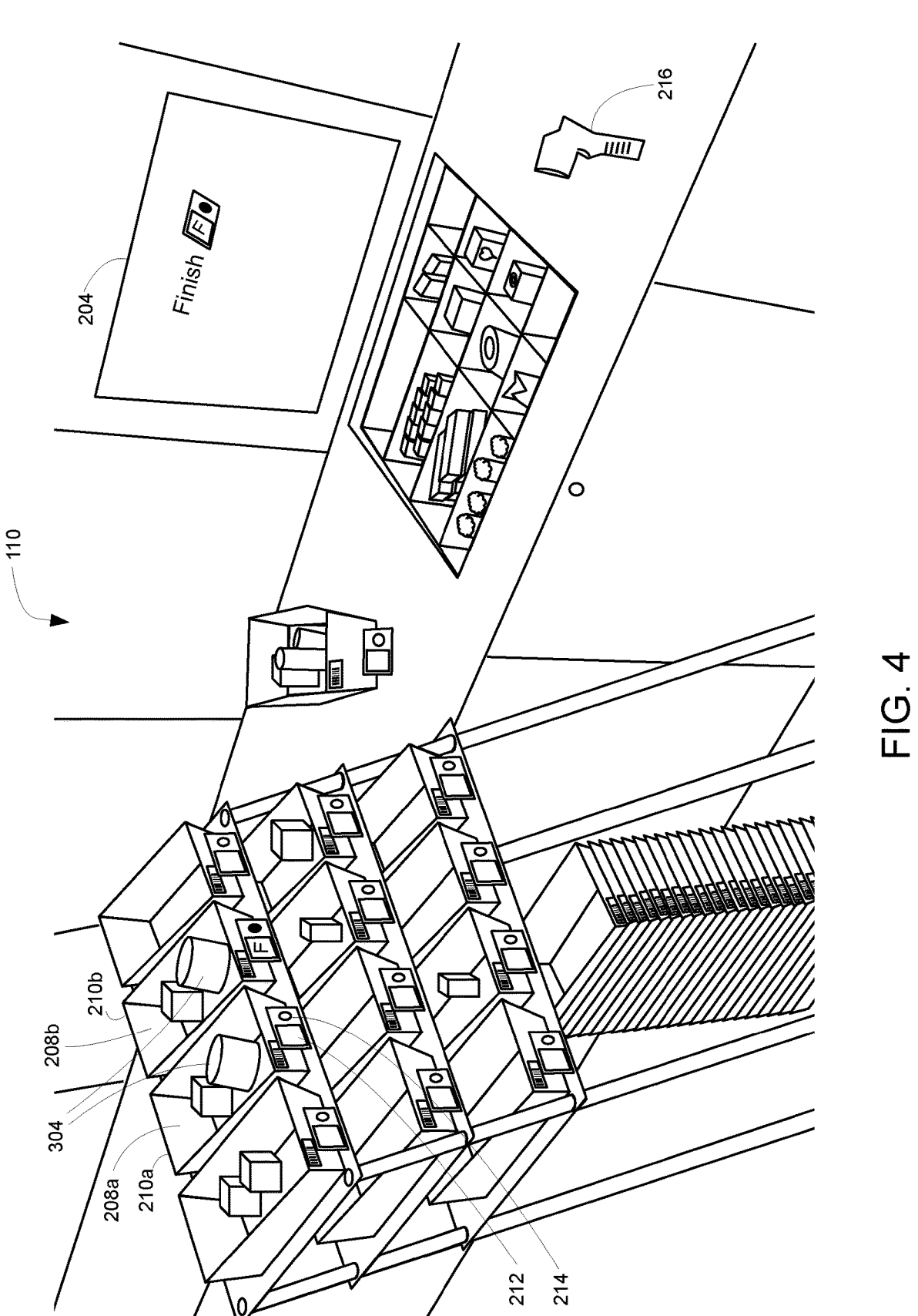
FIG. 4 illustrates a perspective view of the workstation of FIG. 3 after the picking agent has followed the instructions shown on the displays to pick some items.

FIG. 4 illustrates a perspective view of the workstation 110 after the picking agent has followed the instructions shown on the displays 204, 212 of FIG. 3. In particular, the two instances of the first item 304 are picked and placed in their respective put-spot totes 210a,b. Both the buttons 214 on said put-spots 208a,b have been pressed and the display screen 204 has thus moved on to a next instructions. In this case, one of the multi-SKU orders is finished and the display screen 204 instructs the user to find the put location 208 displaying an "F" icon (representing "finished") and move that tote 210 to the conveyer belt system for transport to a packaging stage. As shown, the put-spot display 212 on the finished put location indicates the "F" icon and that spot's button 214 is illuminated to help the user find the appropriate tote 210*b*. The user then physically lifts the tote 210*b* from its put-spot 208*b* and places the tote 210*b* on a conveyer belt adjacent the workstation 110. These actions inform the workstation 110 controller and/or warehouse controller 102 that the completed customer order is on its way in the designated tote 210*b* to the packaging department for shipping to the appropriate destination address as per the order.

Figure 5:
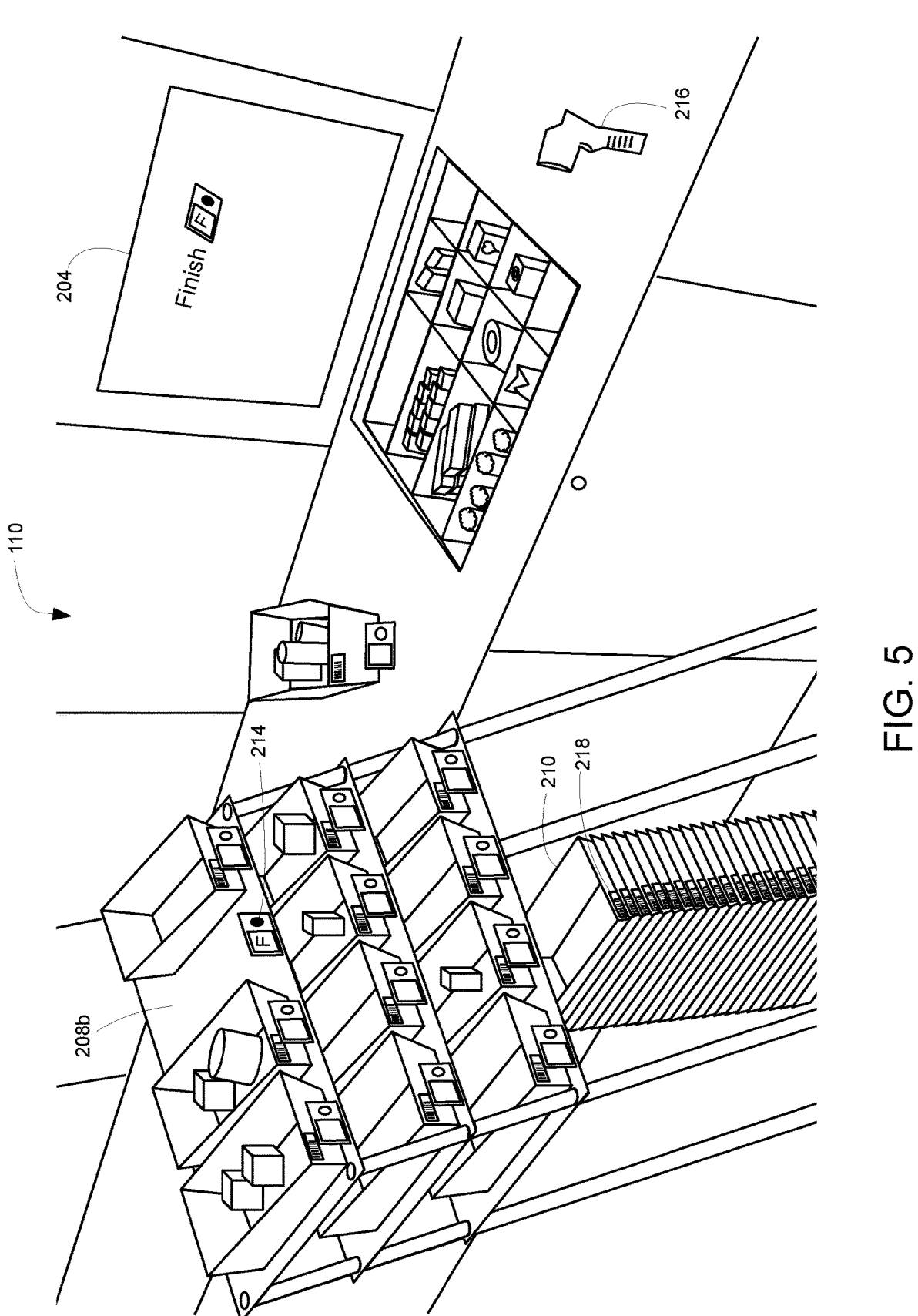
FIG. 5 illustrates a perspective view of the workstation after the picking agent has removed the finished tote and placed it on the conveyer belt as per the instructions shown in FIG. 4.

FIG. 5 illustrates a perspective view of the workstation 110 after the picking agent has removed the finished tote 210*b* and placed it on the conveyer belt as per the instructions shown in FIG. 4. The user then picks an unused tote 210 from the supply below the put-wall 206, scans the barcode 218 of the unused tote 210, places this new tote 210 into the empty put-spot 208*b*, and presses the illuminated button 214 for that put-spot 208*b*. These actions inform the workstation 110 controller and/or warehouse controller 102 that the workstation 110 now has an available "multi" put-spot 208 ready to accept another multi-SKU order from the pending orders awaiting processing.

Figure 6:
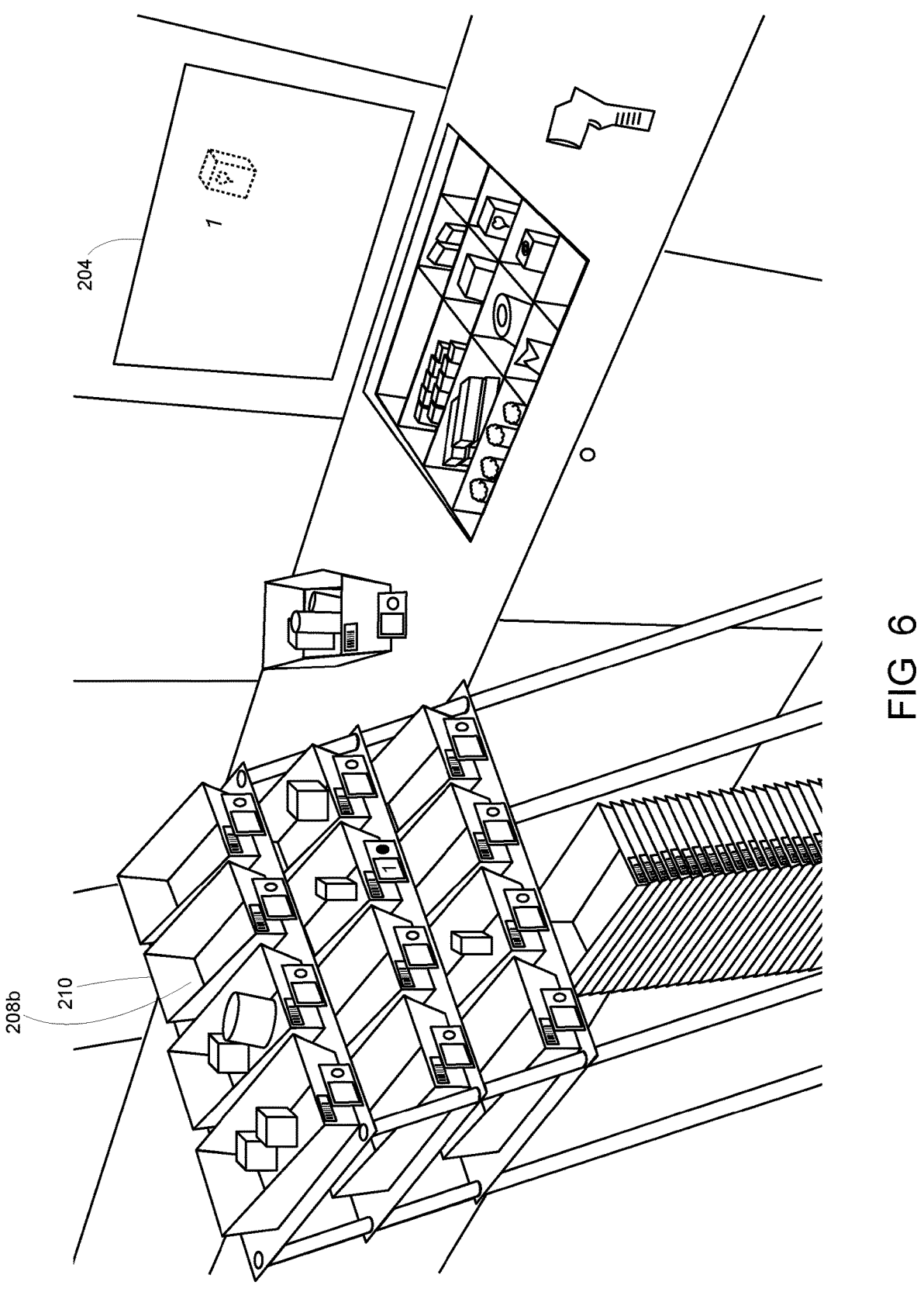
FIG. 6 illustrates a perspective view of the workstation after the picking agent has placed a new tote in the available put-spot as per the instructions shown in FIG. 5.

FIG. 6 illustrates a perspective view of the workstation 110 after the picking agent has placed a new tote 210 in the available put-spot 208*b* as per the instructions shown in FIG. 5. Upon the picking agent pressing the put-spot button 214, the controller 102 dynamically selects and assigns a new multi-SKU order to the workstation 110. The tote 210 at this put-spot 208*b* now corresponds to the new multi-SKU order assigned to the workstation 110. The picking agent then continues picking items from the bin 300 as per the instructions on the front display device 204 and tote displays 212.

Figure 7:
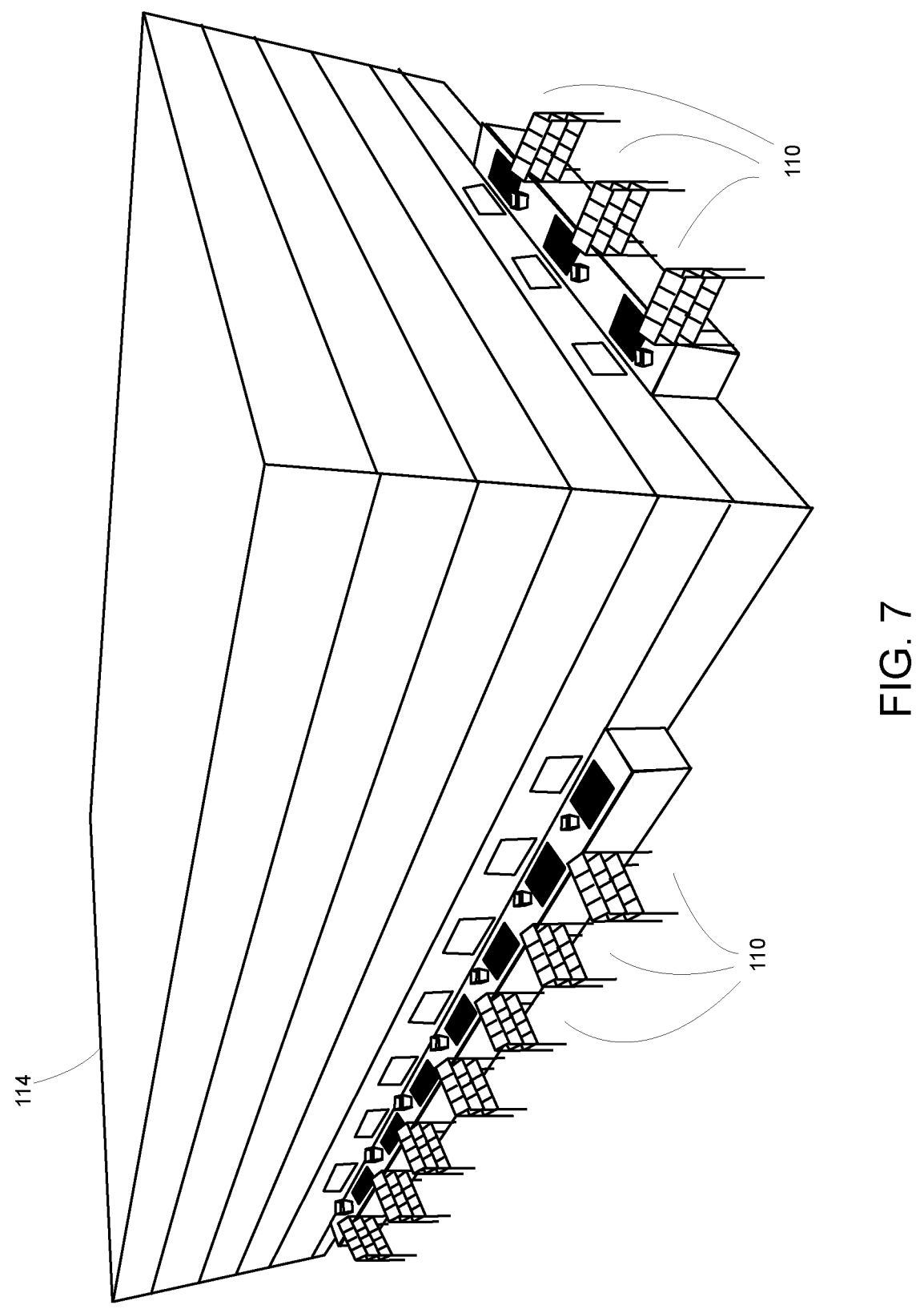
FIG. 7 illustrates a perspective view of a bin storage facility having a plurality of picking workstations around its perimeter according to an exemplary embodiment.

FIG. 7 illustrates a perspective view of a bin storage facility 114 having a plurality of picking workstations 110 around its perimeter according to an exemplary embodiment. In this embodiment, the bin storage facility 114 is a three dimensional storage and retrieval grid structure that contains cells organized in rows and columns within the grid structure. An example of such a grid structure is illustrated in U.S. Pat. No. 10,336,540 entitled, "STORAGE AND RETRIEVAL SYSTEM", which is incorporated herein by reference. A plurality of picking workstations 110, each having the structure and operation as described above with reference to FIGS. 2 to 6, are positioned around a lower perimeter of the bin storage facility 114.

Figure 8:
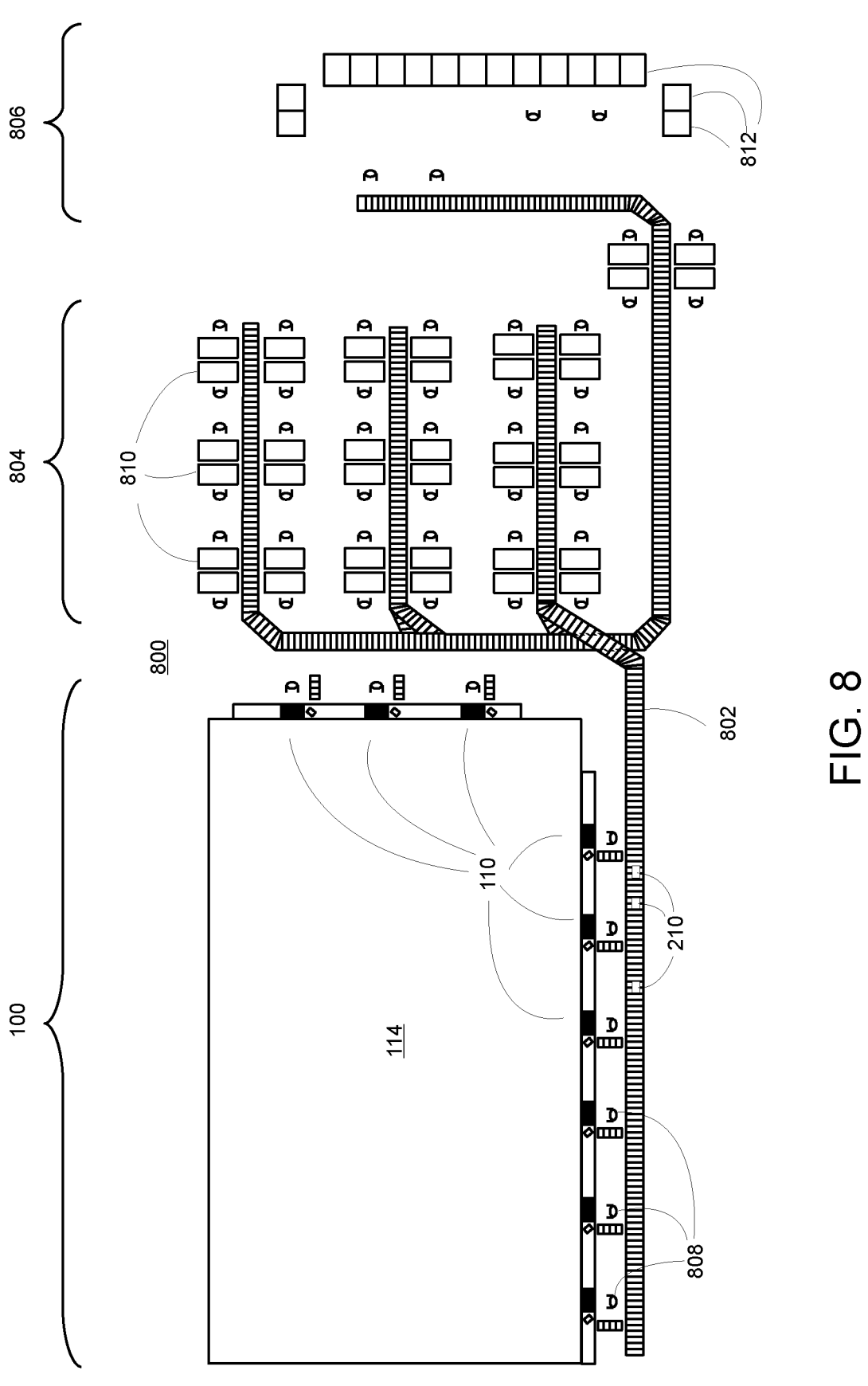
FIG. 8 illustrates plan view of an order fulfillment system according to an exemplary embodiment of the present invention.

FIG. 8 illustrates plan view of an order fulfillment system 800 according to an exemplary embodiment of the present invention. The order fulfillment system 800 includes the automated storage and retrieval system 100 of FIG. 1 as a first stage, along with a conveyer belt system 802 for moving picked items from the workstations 110 to a packing stage 804 and then a shipping stage 808. As illustrated, the bin storage facility 114 has picking workstations 110 on two sides, and the conveyer belt system 802 is adjacent the picking stations 110 such that picking agents 808 working in the stations 110 can easily place completed totes 210 onto the conveyer belt system 802. The conveyer belt system 802 transports the totes 210 to one of a plurality of packing stations 810 where workers pack the items into parcels such as padded envelopes and boxes, and add address labels to the outsides of the parcels. The parcels are then placed back onto the conveyer belt system 802 where they are automatically transported to the shipping stage 806. The conveyer belt system 802 may be a double decker conveyer having a top level to deliver the totes to the packing stations and a lower level that conveys the parcel to shipping. At the shipping stage 806, the parcels are loaded into appropriate shipping containers 812 and vehicles for transport externally to customers. Examples of shipping containers include gaylords and other perforated boxes, and examples of vehicles include courier and mail trucks.

Figure 9:
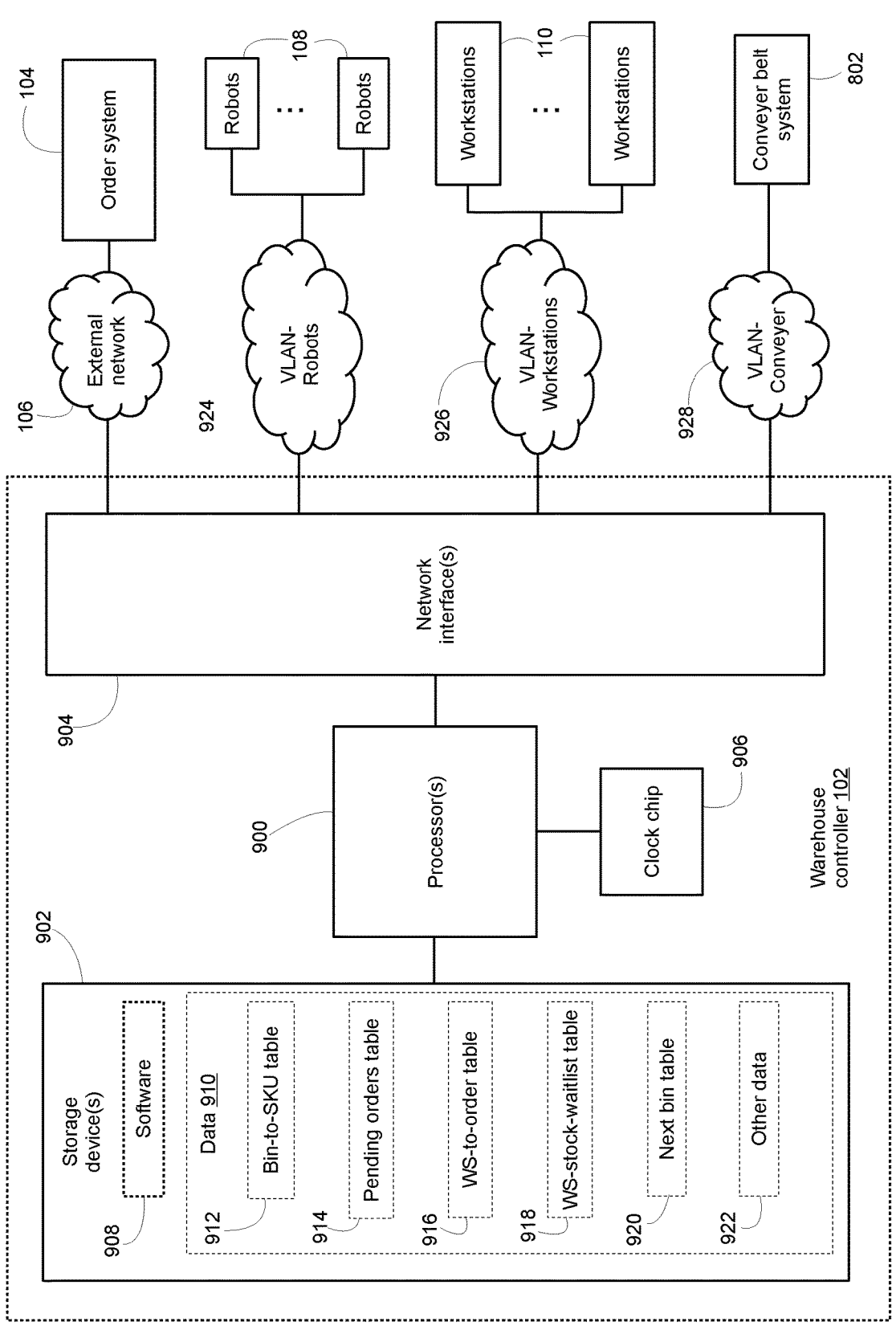
FIG. 9 illustrates a block diagram of the warehouse controller of FIG. 1 according to an exemplary embodiment.

Beneficially, the automated storage and retrieval system 100 in this embodiment picks directly to customer order totes 210 that can each contain all items needed for one or more customer orders such that the order(s) can be packaged and shipped to customers. There is no "sortation" stage in the fulfillment system layout 800 illustrated in FIG. 8 thereby saving floor space and speeding order processing. Sortation is instead "built-in" to the picking process at each workstation 110 because multi-SKU order totes 210 are completed at each workstation 110 and then passed to packaging 804 without requiring an intermediate sortation stage. Furthermore, in this embodiment, the picking process is waveless meaning that pending orders can be added to any available workstation 110 at any time. Pending orders can be rearranged in order based on priority at any time and there are no batches that need to be managed in separate waves. Thus, efficiency and flexibility are both increased in comparison with the typical order-picking systems described in the background section, FIG. 9 illustrates a block diagram of the warehouse controller 102 of FIG. 1 according to an exemplary embodiment. The warehouse controller 102 is a computer server including one or more processors 900. The one or more processors 900 may be included in a central processor unit (CPU) of the computer server acting as the warehouse controller 102. In the following description the plural form of the word "processors" will be utilized as it is common for a CPU of a computer server to have multiple processors (sometimes also referred to as cores); however, it is to be understood that a single processor 900 may also be configured to perform the described functionality in other implementations.

The processors 900 are coupled to one or more storage devices 902, one or more network interfaces 904, and a clock chip 906. The one or more storage devices 902 include a plurality of software instructions 908 such as software modules for execution by the processors 900 along with data 910 utilized by the processors 900 when executing the software 908. The data 910 is organized into a database having a plurality of tables in this embodiment, and examples of the tables include a bin-to-SKU 912, a pending orders table 914, a workstation-to-order ("WS-to-order") table 916, a workstation-stock-waitlist table 918, and a next bin data table 920. These tables are merely exemplary for this embodiment and other data 922 may also be stored as needed in other embodiments. In this embodiment, a relational database is utilized to store the required data 910; however, the terms "database" and "tables" as utilized in this description is meant to refer to any stored collection of organized data 910.

The network interface(s) 904 provide communications ability from the warehouse controller 102 to other elements in the automated storage and retrieval system 100 and order fulfillment system 800 in general. In particular, the network interfaces 904 couple the warehouse controller 102 to an external network 106 such as the Internet for communicating with an order system 104. New pending orders are received in this embodiment from the order system 104, which may be run by an online store or other retailer that receives orders from customers via an e-commerce website. The network interfaces 904 are further coupled to a first virtual local area network (VLAN-robots) 924 designed for the robots 108. In this embodiment, the warehouse controller 102 dispatches commands to the robots 108 via VLAN-robots 924. The network interfaces 904 are coupled to a second virtual local area network (VLAN-workstations) 926 designated for the workstations 110. In this embodiment, the workstations 110 are themselves computer-controlled and have their own processors 1002, described below with reference to FIG. 10. The warehouse controller 102 communicates with the workstations 110 via VLAN-workstations 926 in order to assign orders to the workstations 110 and to receive notifications from the workstations 110 when orders are picked and placed onto the conveyer belt system 802. Lastly, the network interfaces are coupled to the conveyer belt system 802 via a VLAN-conveyer 928 in order send commands to actuate different parts of the conveyer belt system 802 to move completed totes 210 from the picking workstations 110 to the packaging stations 810 and then to move parcels from packaging stations 810 to the shipping stage 812 (see FIG. 8).

Figure 10:
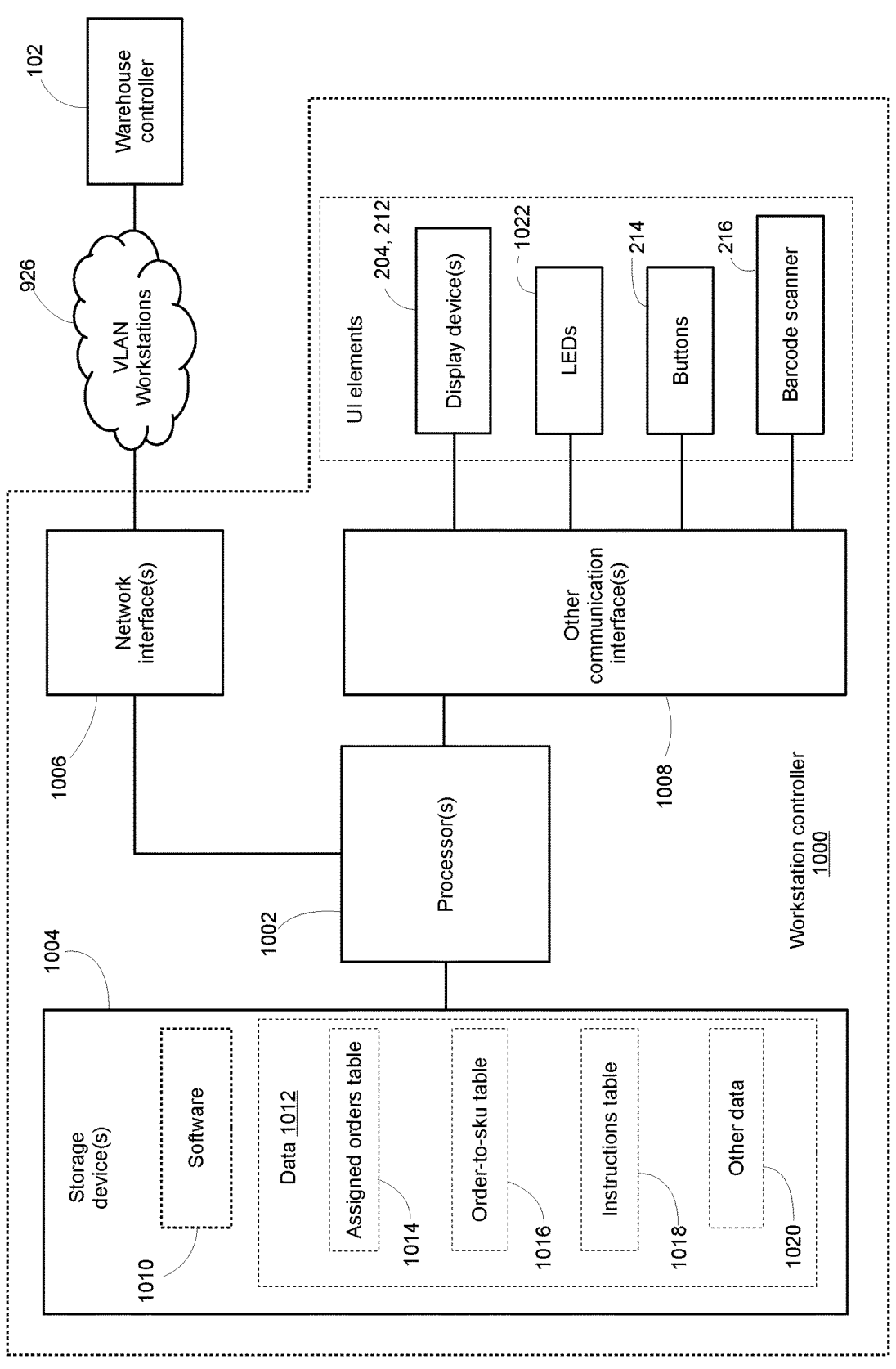
FIG. 10 illustrates a block diagram of a workstation controller according to an exemplary embodiment.
Figure 12:
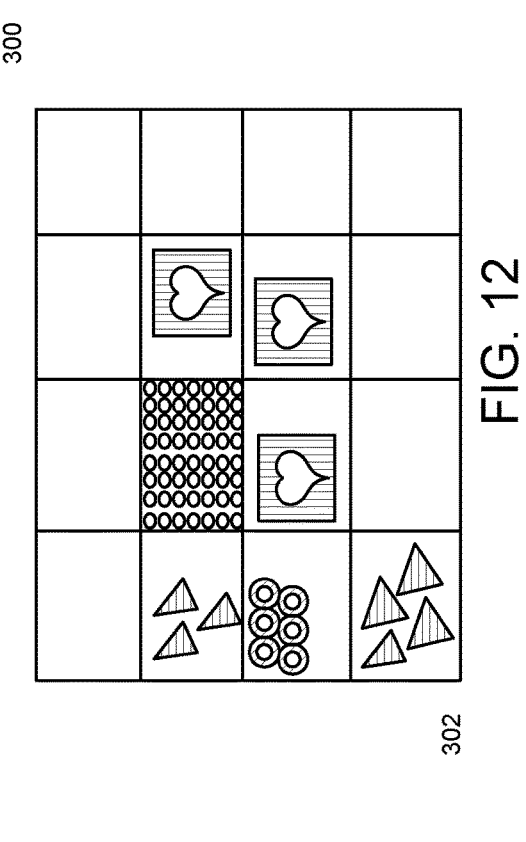
FIGS. 11 to 14 illustrate examples of different multi-SKU bins that may be stored in the bin storage facility according to different embodiments.
Figure 14:
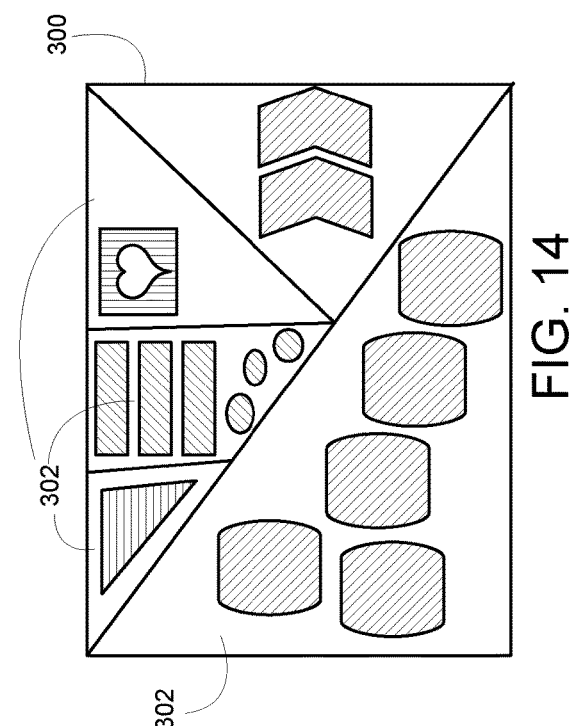
Figure 11:
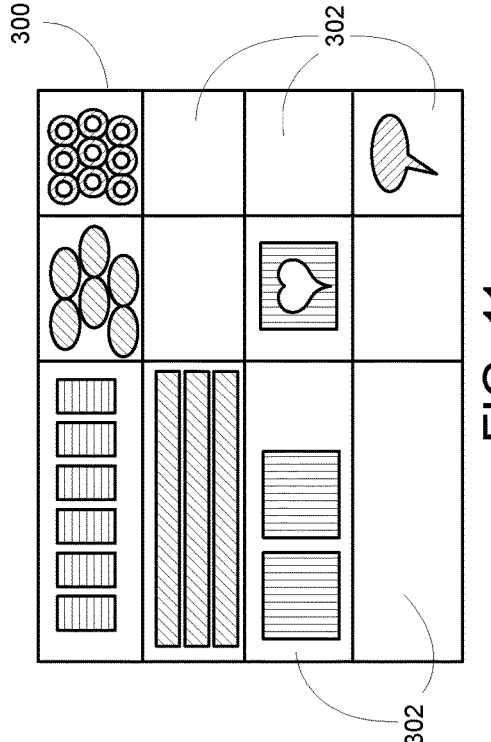
Figure 13:
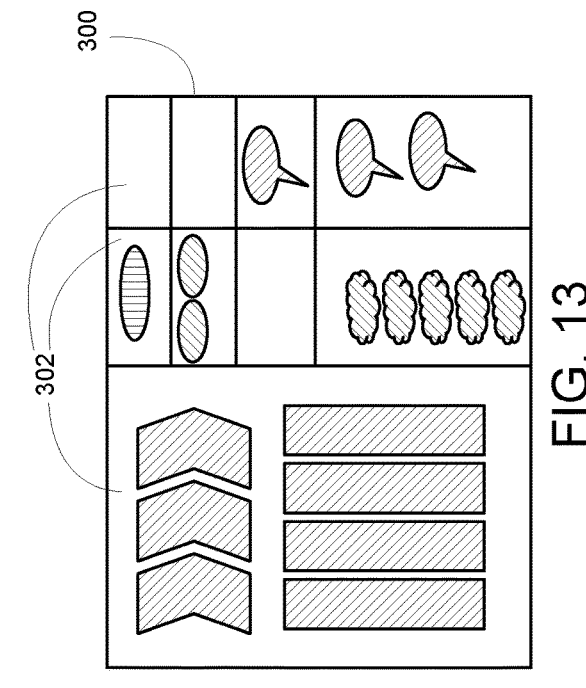

FIG. 10 illustrates a block diagram of a workstation controller 1000 according to an exemplary embodiment. Similar to the warehouse controller 102, the workstation controller is a computer server including one or more processors 1002. Again, the plural form of the word "processors" will be utilized; however, it is to be understood that a single processor 1002 may also be configured to perform the described functionality in other implementations.

In this embodiment, the processors 1002 of the workstation controller 1000 are coupled to one or more storage devices 1004, one or more network interfaces 1006, and one or more other communication interfaces 1008. The storage devices 1004 store software instructions 1010 for execution by the processors 1002 along with data 1012 utilized by the workstation controller 1000 including an assigned orders table 1014, an order-to-SKU table 1016, an item-for-picking instructions table 1018, and other data 1020 as required. The network interfaces 1006 are coupled via the VLAN-workstations 926 back to the warehouse controller 102. The other communication interfaces 1008 may include wired interfaces such as universal serial bus (USB) transceivers and wireless interfaces such as Bluetooth transceivers to thereby couple the processors 1002 to the display devices utilized to provide instructions to the picking agent and other equipment at the workstation 110 such as one or more light emitting diodes (LEDs) integrated into the buttons 214 of the put-spots 208 on the put-wall 206, one or more put-spot buttons 214, and the wireless barcode scanner 216.

FIGS. 11 to 14 illustrate examples of different multi-SKU bins 300 that may be stored in the bin storage facility 114 according to different embodiments. As explained further in the following, the warehouse controller 102 in this embodiment actively assigns orders to workstations 110 in order maximize items picked per bin presentation at the workstation 110. This controller takes advantage of storing stock of different SKUs across a wide variety of bins 300. In some embodiments, the kitting of the bins 300 (i.e., adding new inventory to the bins 300) is done in a random fashion such that product SKUs are randomly distributed throughout bins 300 in the bin storage facility 114. In some embodiments, the kitting is prescriptive such that affinities are stored together meaning that SKUs that are often ordered together by customers are stored in a same bin. However, as explained in the background section, e-commerce orders are often small and there may be no known affinity for many orders. Thus, random inventory storage is one kitting technique utilized for a least of portion of the inventory in the storage facility in some embodiments.

To facilitate easy picking, the multi-SKU bins 300 may be sub-divided into any number of separate compartments 302 of any desired shape. FIGS. 11 to 14 show some examples. As illustrated, stock for different types of products (i.e., different SKUs) are stored in a same bin. In some embodiments, each compartment 302 holds stock for a different SKU; however, this is not a requirement and a same compartment 302 in the bin 300 may hold stock for different SKUs.

The bin-to-SKU table 912 holds electronics records indicating a particular one or more SKUs for which there is stock in each bin along with a quantity of said stock. A very simple example of a portion of a bin-to-SKU table 912 is as a follows:

TABLE 1

| Example bin-to-SKU table 912 | | |
| --- | --- | --- |
| Bin identifier (ID) | SKU | Quantity |
| Bin55 | SKU-86572 (toothbrush) | 100 |
| | SKU-82145 (camera) | 3 |
| | SKU-65896 (speaker) | 1 |
| Bin57 | SKU-86572 (toothbrush) | 150 |
| | SKU-58741 (toy) | 10 |

Other columns may be included as desired such as having a SKU-to-compartment column specifying the compartment of the bin in which the SKU is stored.

As shown, both Bin55 and Bin57 are multi-SKU bins in this example. Bin55 includes stock for three different SKUs including stock for a toothbrush type, a camera type and a speaker type. Likewise Bin57 includes stock for two different SKUs including stock for the same toothbrush type as stored in Bin55 and a toy that is not stored in Bin55. In this embodiment, the warehouse controller 102 tracks a stock waitlist 918 for each workstation 110. The stock waitlist 918 for a workstation 110 indicates quantities of one or more SKUs still required to be delivered to the workstation 110 in order to fulfil the current orders assigned to the workstation 110. In this embodiment, there is a separate stock waitlist 918 for each workstation 110.

To maximize the items picked per bin presentation and thereby minimize the number of bin 300 moves that need to be performed by the robots 108, the warehouse controller 102 dynamically selects a multi-stock bin 300 that, according to the bin-to-SKU table 912 records, contains stock for a highest number of unique SKUs indicated on the stock waitlist 918. As a simple example, if a particular workstation 110 has a first plurality of orders assigned to it that require the delivery of stock for SKU-86572 (toothbrush) and SKU-82145 (camera), the warehouse controller 102 dynamically selects Bin55 for delivery to the workstation 110. In another example, if the particular workstation 110 instead has a second plurality of orders assigned to it that require the delivery of stock for SKU-86572 (toothbrush) and SKU-58741 (toy), the warehouse controller 102 dynamically selects Bin57 for delivery to the workstation 110.

In this embodiment, the warehouse controller 102 further dynamically selects orders for assignments to each workstation 110 taking into account the stock waitlists 918 for each workstation 110 in conjunction with the desired SKUs for each order. Again, as a simple example, if a particular workstation 110 as a first plurality of orders assigned to it that require the delivery of stock for SKU-86572 (toothbrush), the warehouse controller 102 may dynamically assign one or more pending orders for SKU-82145 (camera) and SKU-65896 (speaker), or one or more pending orders for SKU-58741 (toy) to the same particular workstation 110. This is because, as per the above bin-SKU-table shown in Table 1, only a single bin, i.e., Bin55, will need to be delivered to the workstation 110 in order to pick combinations of SKU-86572 (toothbrush) with SKU-82145 (camera) and SKU-65896 (speaker); and only a single bin, i.e., Bin57, will need to be delivered to the workstation 110 in order to pick combinations of SKU-86572 (toothbrush) with SKU-58741 (toy).

In short, the warehouse controller 102 in this embodiment makes at least two types decisions:

A. For each pending order, determine which workstation 110 to assign the pending order such that the number of bins 300 required to be delivered to workstation 110 is minimized; and B. For each available robot 108, determine a particular bin 300 of the bin storage facility 114 to retrieve and a particular workstation 110 to deliver it to such that the number of bins 300 required to be delivered to the workstation 110 is minimized.

As a typical bin storage facility 114 will contain a huge number of bins 300 that have constantly changing SKU numbers and continually arriving new orders to be processed, in this embodiment, the warehouse controller 102 continually updates a pending orders table 914 and a next bin table 920 that together provide information the controller 102 utilizes to make fast decisions whenever there is a new order ready to assign and/or an available robot 108 to command.

A simplified example of a next bin table 920 according to this embodiment is as follows:

TABLE 2

| Example next bin table 920 | | | | |
| | Next bin | | | |
| Workstation | Stock waitlist | Pending order 1 | Pending order 2 | Pending order 3 |
| Workstation-1 | Bin53 | Bin53 | Bin32 | Bin78 |
| Workstation-2 | Bin902 | Bin102 | Bin902 | Bin11 |
| Workstation-3 | Bin12 | Bin12 | Bin44 | Bin11 |

Each row of the next bin table 920 represents options for a particular workstation 110. Taking the first workstation 110 (Workstation-1) as an example, if no new pending order is assigned to the workstation 110, the next bin that should be delivered to the workstation 110 according to the current stock waitlist 918 of the workstation 110 is Bin53. Alternatively, if pending order 1 is assigned to the first workstation 110, the next bin that should be delivered is still Bin53. The remaining columns are the next bins that should be delivered to the workstation 110 assuming each of the other pending orders are instead assigned to the workstation 110. Further description of how the controller 102 determines these next bins values for each column in the table is provided below with reference to the flowchart of FIG. 15.

A simplified example of a pending orders table 914 according to this embodiment is as follows:

TABLE 3

| Example pending orders table 914 | | | |
| Pending order | Workstation-1 weight | Workstation-2 weight | Workstation-3 weight |
| Pending order 1 | 1.50 | 1.05 | 0.87 |
| Pending order 2 | 0.79 | 2.00 | 0.45 |
| Pending order 3 | 1.37 | 1.00 | 1.09 |

Each row of the pending orders table 914 represents options for a pending order that is not yet assigned to ay workstation 110. Taking the first pending order as an example, the workstation-1 weight column is an order weighting representing assignment of the first pending order to the first workstation 110. The higher the weight value in this embodiment, the better the assignment would be. Thus, given the highest weight for the first pending order being for workstation-1 in this example, the first pending order should be assigned to the first workstation 110. Likewise, the second pending order should be assigned to the second workstation 110 in this example, and the third pending order should be assigned to the first workstation 110 in this example. Further description of how the controller 102 determines these next bins values for each column in the table is provided below with reference to the flowchart of FIG. 15.

Figure 15:
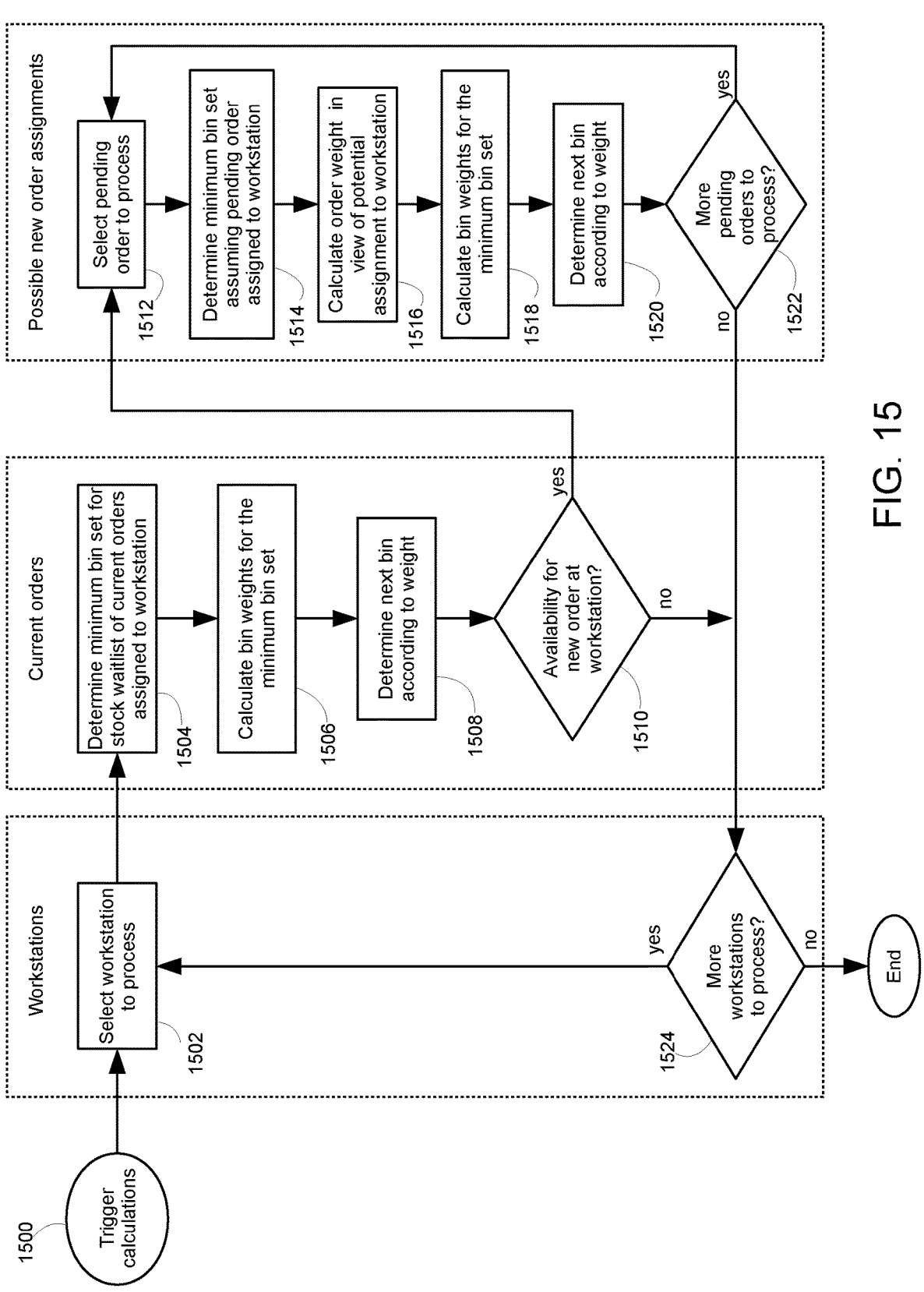
FIG. 15 shows a flowchart of a method of calculating the next bin table and the pending order table according to an exemplary embodiment.

FIG. 15 shows a flowchart of a method of calculating the next bin table 920 and the pending order table 914 according to an exemplary embodiment. The steps of FIG. 15 may be performed by the processors 900 of the warehouse controller 102 executing the software instructions 908 loaded from the storage device 902. The steps of the flowchart are not restricted to the exact order shown, and, in other configurations, shown steps may be omitted or other intermediate steps added.

In this embodiment, the calculating and updating of the above-described next bin and pending orders table is an iterative process that iterates through all workstations 110, all current orders assigned to said workstations 110, and all pending orders awaiting assignment.

The process begins at step 1500 upon the occurrence of a calculations trigger event. In some embodiments, the calculations are automatically triggered upon a change of any of a workstation's stock waitlist 918, a change to bin contents in the bin storage facility 114, or a new pending order being received by the warehouse controller 102 from the order system. Other trigger events may also be utilized such as time-based triggers such as periodically performing the calculations to update the tables once every X minutes or even seconds. Likewise, mode changes to the system 100 such as changing global weighting categories or inventory selection strategies may also trigger the process. Combinations of these trigger events may also be utilized such as trigger the calculations once every five minutes assuming there has been at least one stock waitlist change, bin contents change, or new pending order.

At step 1502, the warehouse controller 102 selects a workstation 110 to process. In some embodiments, workstations 110 are selected in a round robin format such as sequencing through all of the workstations 110 one by one in some order.

At step 1504, the warehouse controller 102 determines a minimum bin set for the stock waitlist 918 of current orders assigned to the workstation 110.

As previously mentioned, the stock waitlist 918 refers to all SKUs and their respective quantities that still need to be delivered to the workstation 110 in order to fulfil the orders currently assigned to the workstation 110. As new orders are assigned to the workstation 110, the stock waitlist 918 grows. As bins are dispatched for delivery to the workstation 310, the stock waitlist 918 shrinks.

Given the stock waitlist 918 for the workstation 110, at step 1504 the warehouse controller 102 in this embodiment is determining a minimum bin set representing a specific set of bins 300 that if all delivered to the workstation 110 would enable the picking agent to pick all items on the stock waitlist 918 and thereby complete all orders. As a very simple example utilizing the above example bin-to-SKU table 912 shown in Table 1, if the stock waitlist 918 for particular workstation 110 included one item of SKU-86572 (toothbrush) and one item of SKU-82145 (camera), the minimum bin set determined by the controller at this step would be {Bin55} as this single bin being delivered to the workstation 110 would enable all items on the stock waitlist 918 to be picked. Alternatively, if the stock waitlist 918 instead included one item of SKU-82145 (camera) and three items of SKU-58741 (toy), the minimum bin set determined at this step would be {Bin55, Bin57} as both bins would be required to be delivered to the workstation 110 to pick these two different SKUs. Further details including a process for determining the minimum bin set for an arbitrary stock waitlist 918 according to an exemplary embodiment is provided below with reference to FIG. 16.

At step 1506, the warehouse controller 102 calculates a bit weight for each of the bins in the minimum set. The bin weight in some embodiments may be the number of unique individual SKUs contained in the bin that match SKUs found on the stock waitlist 918 for the workstation 110. In other words, a bin weight of "4" would represent four required SKUs for the price of one bin retrieval. In another embodiment, the bin weight means the total number of items picked regardless of the SKU (many SKUs could have multiple items picked). A higher bin weight means more items can be picked per bin presentation. The items picked per bin presentation may also be referred to as a "batch factor". Higher batch factors means reduced bin moves required by the robots 108 and therefore better efficiency.

In some embodiments, the bin weight for each bin on the minimum set is calculated by taking into account a plurality of factors that may or may not include the batch factor. For example, the bin weight may be a combination of the batch factor weighted according to some factor and other characteristics of the bin such as an inventory selection such as lowest inventory (a bin with a smaller number of inventory is given an increased weight), highest inventory (a bin with a larger number of inventory is given an increased weight), oldest inventory (a bin with older inventory is given an increased weight), and newest inventory (a bin with newer inventor is given an increased weight). These additional weighting factors may be useful in certain applications such as weighting bins with older inventory to have higher weights for grocery applications, or weighting bins with higher numbers of inventory to have higher weights in order to keep multi-stock bins present in the bin storage facility 114 as long as possible, etc.

Any desired weighting factors and combinations thereof may be utilized at this step. For instance, the bin weight of a certain bin may also take into account the one or more current orders assigned to the workstation 110 that will be helped toward fulfillment by the bin such as by maximizing the items picked per bin presentation (IPP). A higher priority order may result in the bins that will help fulfil that order receiving higher bin weights. Likewise, an order that has a longer hold time (where hold time is the difference in time between when the order was received and the current time—i.e., the processing time for the order) may result in the bins that will help fulfill that order receiving higher bin weights.

The algorithm utilized to calculate the bin weights and/or the global weighting factors may also dynamically change at different times of the day or in response to different events and situations. In an example embodiment, a bin weight may be determined utilizing a formula such as: $bin\_weight=(IPP)*(IPP\_factor)+(Hold\_time)*(Hold\_time\_factor)+(Priority)*(Priority\_factor)$ where:

IPP is the items picked per bin presentation (i.e., batch factor)

IPP_factor is a global weighting factor for IPP across the system

Hold_time is the current processing time for an order that would be helped by the bin Hold_time_factor is the global weighting factor for hold time across the system Priority is the order priority (i.e., Low, Normal, Expedite) for the order that would be helped by the bin Priority_factor is the global weighting factor for priority across the system The above-described global weighting factors may change over time. For example, at the beginning of a day, the batch factor for a bin may predominantly determine that bin's weight due to the IP_factor parameter being higher. However, as the day goes on and time gets closer and closer to a shipping deadline or other cut-off time, the hold_time and/or priority may predominantly determine that bin's weight due to the IP_factor being lowered. In another example, a customer may value productivity above all else and therefore weight the batch factor highest.

The following table shows a simple example of calculating some bin weights for bins in an example minimum bin set comprising {Bin53, Bin34} for a workstation 110:

TABLE 4

| Example bin weights for bin set | |
|---|---|
| Bin ID | Bin weight |
| Bin53 | 1.35 |
| Bin34 | 0.66 |

At step 1508, the warehouse controller 102 determines the next bin according to the bin weights calculated at step 1506.

For example, assuming the bin weights shown above in Table 4, the warehouse controller 102 selects Bin53 as the next bin for this workstation 110 since Bin53 has the highest bin weight. Assuming the workstation 110 being processed is the first workstation 110, this step corresponds to the warehouse controller 102 storing the value "Bin53" in the "Stock waitlist" column of the next bin table for "Workstation-1"—see above Table 2, for example.

At step 1510, the warehouse controller 102 checks to see if the workstation 110 being processed has an empty put-spot 208 and thus availability to accept a new order assigned to the workstation 110. If there are no empty put-spots 208 at the workstation 110, control proceeds to step 1524 to start processing a next workstation 110. However, if there is an empty put-spot 208 and thus availability at the workstation 110 to accept a new order for picking, control proceeds to step 1512.

At step 1512, the warehouse controller 102 selects a pending order to process. In some embodiments, the pending orders are selected in a round robin format such as sequencing through all of the pending orders one by one in some order.

At step 1514, the warehouse controller 102 determines a minimum bin set for the workstation 110 being processed assuming the pending order selected at step 1512 is assigned to the workstation 110. Step 1514 is very similar to that described above for step 1504, except now in step 1514 the controller 102 forms the minimum bin set for the workstation 110 being a minimum number of bins of the storage facility that would need to be delivered to the workstation 110 to fulfil both the respective one of the pending orders assumed assigned to the workstation 110 along with the stock waitlist 918 for the workstation 110.

At step 1516, the warehouse controller 102 calculates an order weight in view of potential assignment to the workstation 110.

The order weights in some embodiments is calculated as (1/Num_bins), where Num_bins is the number of bins that would need to be delivered to the workstation 110 assuming the pending order is assigned to the workstation 110. In this way, the order weights of the various pending orders have an inverse relationship with the number of bins that would need to be delivered to the workstation 110 assuming each pending order were assigned to the workstation 110. If a first pending order would require seven bins to be delivered and a second pending order would require four bins to be delivered, the order weight (¼=0.25) for the second pending order would thus be higher than the order weight (1/7=0.14) for the first pending order.

Other techniques may be utilized in a similar manner, but in this embodiment, a first pending order receives a higher order weight than a second pending order when the warehouse controller 102 determines that assigning the first pending order to the workstation 110 would require a lower number of bins 300 to be delivered to the workstation 110 than if the second pending order were assigned to the workstation 110.

Similar to as described above for bin weights calculated at step 1506, the order weights may also take into account any combination of global weighting factors such as order priority (e.g., low, normal, rush), order hold time (e.g., X minutes waiting to be fulfilled), and batch factor (e.g., number of bins).

In an example embodiment, the order weight for a pending order is determined utilizing a formula such as:

$$order\_weight = (1/Num\_bins)*(IPP\_factor) + (Hold\_time)*(Hold\_time\_factor) + (Priority)*(Priority\_factor)$$

where:
Num_bins is the number of bins that would need to be delivered to the workstation 110 assuming the pending order is assigned to the workstation 110
IPP_factor is a global weighting factor for IPP across the system
Hold_time is the current processing time for the order
Hold_time_factor is the global weighting factor for hold time across the system
Priority is the order priority (i.e., Low, Normal, Expedite)

Priority_factor is the global weighting factor for priority across the system

As before, these global weighting factors may be dynamically changed by the controller at different times of the day or in response to different situations.

The following table shows a simple example of calculating some order weights for pending order orders assuming assignment to a particular workstation 110:

TABLE 5

| Example order weights assuming assignment to a particular workstation 110 | |
| --- | --- |
| Pending order | Workstation-1 weight |
| Pending order 1 | 1.50 |
| Pending order 2 | 0.79 |
| Pending order 3 | 1.37 |

At step 1518, the warehouse controller 102 calculates bin weights for each of the bins 300 in the minimum bin set as determined at step 1514. The bin weights at this step are calculated in the same way as described above for step 1506 so a repeated description is omitted for brevity. It is sufficient to note that at this step 1518 the minimum bin set is assuming a particular pending order was assigned to the workstation 110 and thus the bin identifiers in the minimum bin set and also their corresponding bin weights as calculated at step 1516 may be different than the bin weights calculated for the exact same workstation 110 at step 1506.

At step 1520, the warehouse controller 102 determines the next bin according to the bin weights calculated at step 1518. The controller in this embodiment selects the bin with the highest weighting as the next bin and stores the selected next bin in the appropriate cell of the next bin table. Assuming that the workstation 110 being processed is the first workstation 110, the pending order is "Pending order 1", and that Bin53 has the highest weight, step 1520 involves the warehouse controller 102 storing the value "Bin53" in the "Pending order 1" column of the next bin table for "Workstation-1"—see above Table 2, for example.

At step 1522, the warehouse controller 102 checks to see whether there are more pending orders to process for this workstation 110. If no, control proceeds to step 1524 to process a next workstation 110. Otherwise, control returns to step 1512 to select a next pending order for processing.

At step 1524, the warehouse controller 102 checks to see whether there are more workstations 110 to process. If no, the calculation process is complete. Otherwise, control returns to step 1502 to select a next workstation 110 for processing.

Figure 16:
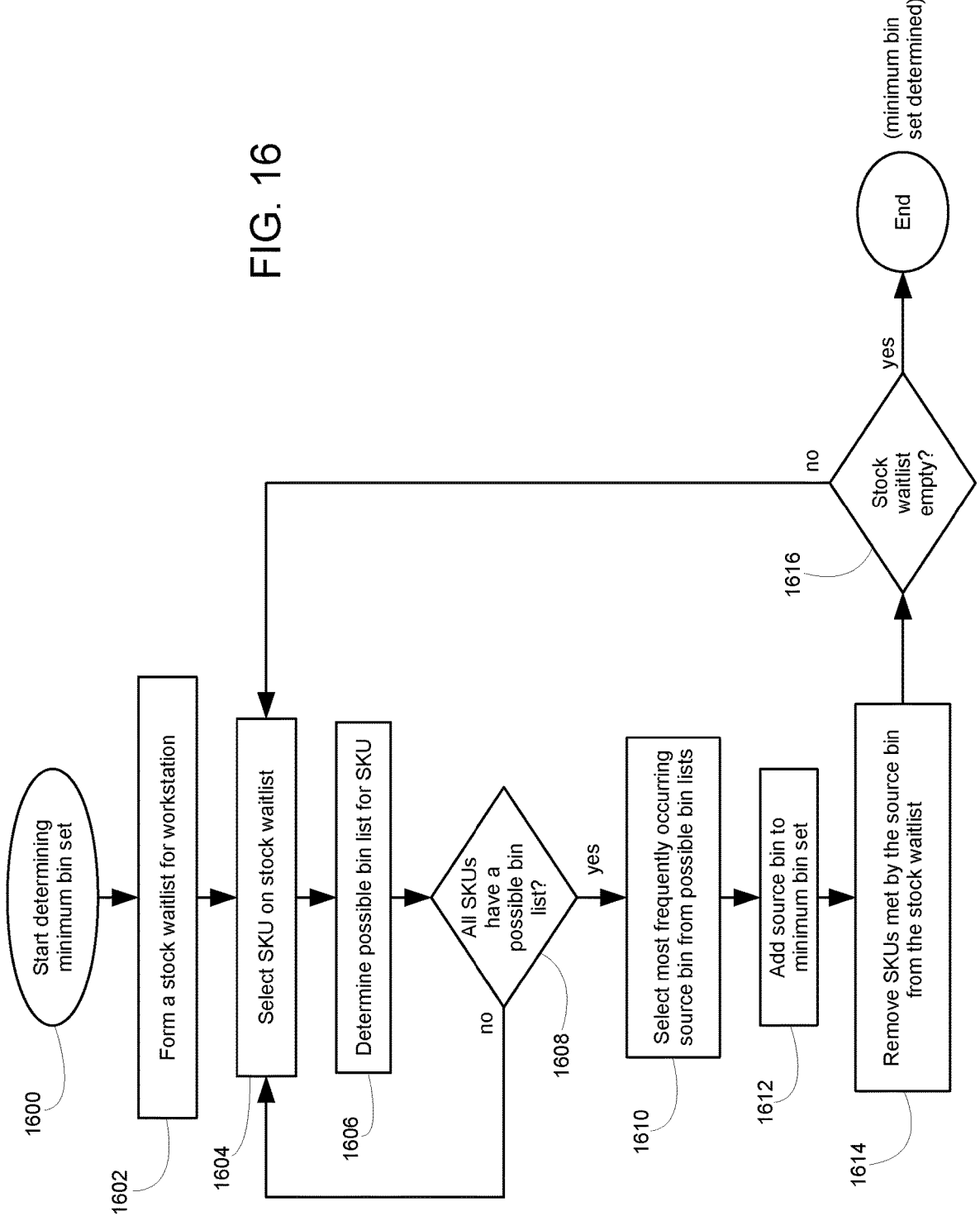
FIG. 16 shows a flowchart of a method of determining a minimum bin set according to an exemplary embodiment.

FIG. 16 shows a flowchart of a method of determining a minimum bin set according to an exemplary embodiment. The steps of FIG. 16 may be performed by the processors 900 of the warehouse controller 102 executing the software instructions 908 loaded from the storage device 902. The steps of the flowchart are not restricted to the exact order shown, and, in other configurations, shown steps may be omitted or other intermediate steps added.

The process begins at step 1600. In this embodiment, the flowchart of FIG. 16 describes how the warehouse controller 102 determines the minimum bin set at each of steps 1504 and 1514 of FIG. 15. The process iterative in that it loops as described in order to build up a minimum bin set. At this first step 1600, the minimum bin set may start as an empty set { }.

At step 1602, the warehouse controller 102 determines a stock waitlist for the workstation 110. For instance, when executing the process for the workstation 110 itself at step 1504, the controller forms the stock waitlist indicating quantities of one or more required stock-keeping units (SKUs) still required to be delivered to the workstation 110 in order to fulfil the one or more current orders assigned to the workstation 110.

Alternatively, when executing the process assuming a particular pending order is assigned to the workstation 110 at step 1514, the controller forms a potential stock waitlist for the workstation 110 at this step. The potential stock waitlist indicates both quantities of the required stock-keeping units (SKUs) still required to be delivered to the workstation 110 in order to fulfil the one or more current orders assigned to the workstation 110 (i.e., the workstation's 110 current stock waitlist 918) along with quantities of the desired stock-keeping units (SKUs) that would further be required to be delivered to the workstation 110 if the particular pending order were assigned to the workstation 110.

At step 1604, the warehouse controller 102 selects a SKU on the stock waitlist formed at step 1602. In some embodiments, the controller selects the first SKU on the waitlist the first time this step is passed and then selects a next SKU still remaining on the waitlist each time around the loop until all SKUs have been removed from the stock waitlist for the workstation 110.

At step 1606, the warehouse controller 102 queries the bin-to-SKU table in order to determine a possible bin list for the SKU selected at step 1604. In some embodiments, the possible bin list is a list of every bin 300 that contains sufficient quantity of the particular SKU. In some situations, it may be the case that no single bin has sufficient quantity for a particular SKU. In this case, it is possible that there may need to be multiple bins called to fulfill the stock waitlist for a single SKU. Multiple bins that must be presented together for a single SKU in this manner may be grouped in a sub-list contained on the possible bin list.

At step 1608, the warehouse controller 102 checks to determine whether all SKUs on the stock waitlist now have their own possible bin list. When no, control returns to step 1604 to select a next SKU at step 1604; alternatively, when all SKUs on the stock waitlist have a possible bin list, control proceeds to step 1610.

At step 1610, the warehouse controller 102 selects a most frequently occurring source bin from the plurality of possible bin lists. For instance, assuming there are five SKUs on the waitlist, and assuming Bin53 contains sufficient stock of all five SKUs, this will mean that Bin53 will be found five times—once per each SKU's possible bin list. In this case, Bin53 would be the most frequently occurring source bin and is selected by the controller.

At step 1612, the warehouse controller 102 adds the most frequently occurring source bin selected at step 1610 to the minimum bin list. For instance, continuing the above example where Bin53 is the most frequently occurring source bin, the minimum bin set now includes Bin53 as follows: {Bin53}.

At step 1614, the warehouse controller 102 removes all SKUs from the stock waitlist that are not met in sufficient quantity by the stock in the most frequently occurring source bin selected at step 1610. Again, continuing the above example, the since all five required SKU items are found in sufficient quantity in Bin53, the stock waitlist at step 1614 in this example would be empty.

At step 1616, the warehouse controller 102 determines whether the stock waitlist is empty. When yes, the process is complete and the minimum bin set is determined. For instance, continuing the above example, the minimum bin set would be {Bin53}. However, in many cases there will not be a single bin in the storage facility that contains sufficient stock to fulfil all SKUs on the stock waitlist of the workstation 110. In the event there are still SKU items remaining on the stock waitlist, control returns to step 1604 to select a next SKU item on the stock list.

Figure 17:
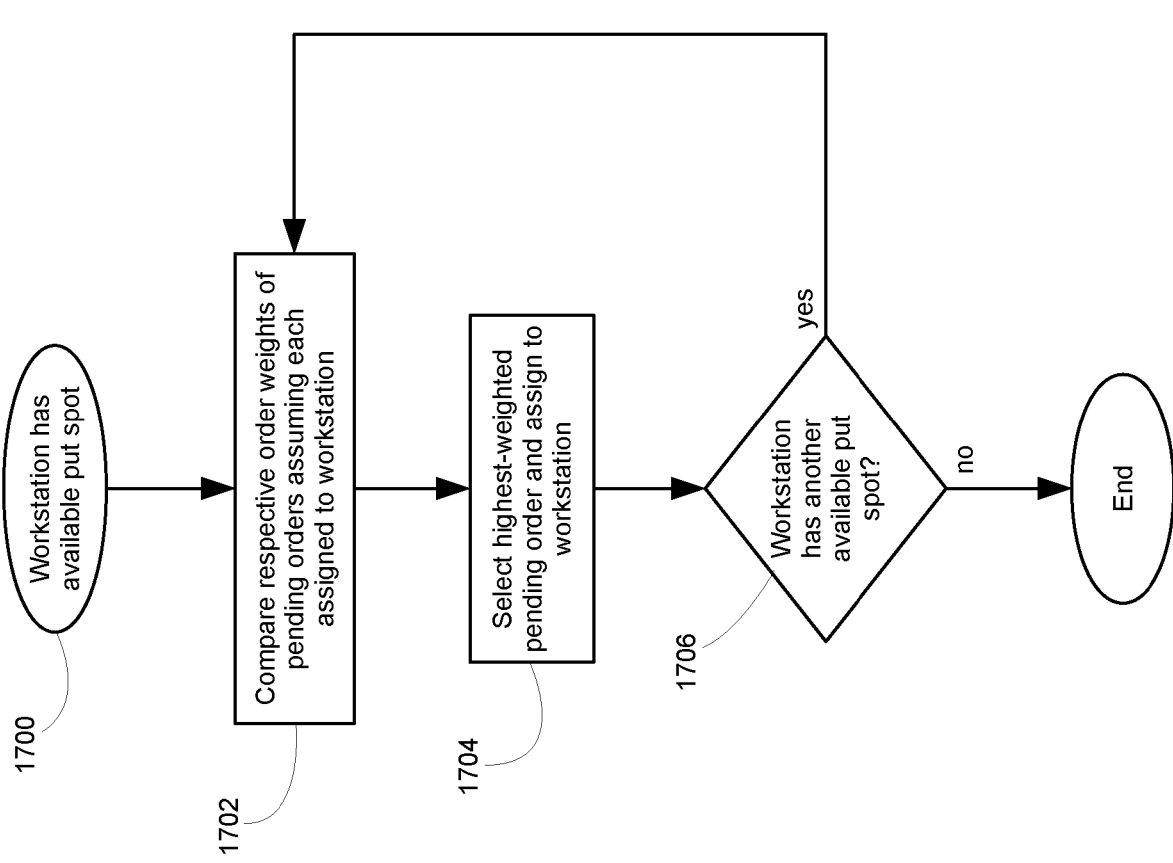
FIG. 17 shows a flowchart describing how one of the pending orders is selected and assigned to a workstation when a workstation has an available put-spot according to an exemplary embodiment.

FIG. 17 shows a flowchart describing how one of the pending orders is selected and assigned to a workstation 110 when a workstation 110 has an available put-spot 208, 220 according to an exemplary embodiment. The steps of FIG. 17 may be performed by the processors 900 of the warehouse controller 102 executing the software instructions 908 loaded from the storage device 902. The steps of the flowchart are not restricted to the exact order shown, and, in other configurations, shown steps may be omitted or other intermediate steps added.

The process of pending order selection and assignment for a particular workstation 110 begins at step 1700 in response to some trigger condition. In some embodiments, order assignment in the manner of FIG. 17 is performed in response to there being at least one robot 108 available to service the workstation 110 and the workstation 110 having at least one available put-spot 208. In this situation, prior to commanding the robot 108 to fetch a particular bin, the controller executes the pending order assignment to fill the empty put-spot 208 as this order assignment may affect which bin is best for the robot 108 to fetch. In other embodiments, the process of FIG. 17 is executed when a workstation 110 has at least one empty put-spot 208, there is a robot 108 available to service the workstation 110, and there is at least some threshold number of pending orders to choose from.

At step 1702, the warehouse controller 102 compares the respective order weights of the pending orders assuming each is assigned to the particular workstation 110. For instance, the controller 102 compares the order weights for all pending orders in the appropriate workstation column of the pending orders table shown in Table 3.

At step 1704, the warehouse controller 102 selects a highest-weighted pending order and assigns this order to the workstation 110. For instance, taking the pending orders table shown in Table 3 and assuming the particular workstation 110 is "Workstation-1", the highest-weighted order is "Pending order 1". The warehouse controller 102 assigns this order to the workstation 110, which involves updating the workstation-to-order table and also updating the WS-stock-waitlist 918 for the first workstation 110. The warehouse controller 102 also sends information regarding the order assignment to the workstation controller in order to allow the workstation displays devices 204 and put wall indicators 212, 214 to instruct the picking agent to fulfil this order. These instructions are stored in the instructions table 1018 at the workstation controller 1000.

At step 1706, the warehouse controller 102 determines whether the particular workstation 110 has another available put-spot 208. When yes, control returns to step 1702 to loop through the process again to select a next highest weighted order for assignment. Otherwise, if the workstation 110 is now full (no empty put-spots), the order selection and assignment process is finished for the workstation 110.

Figure 18:
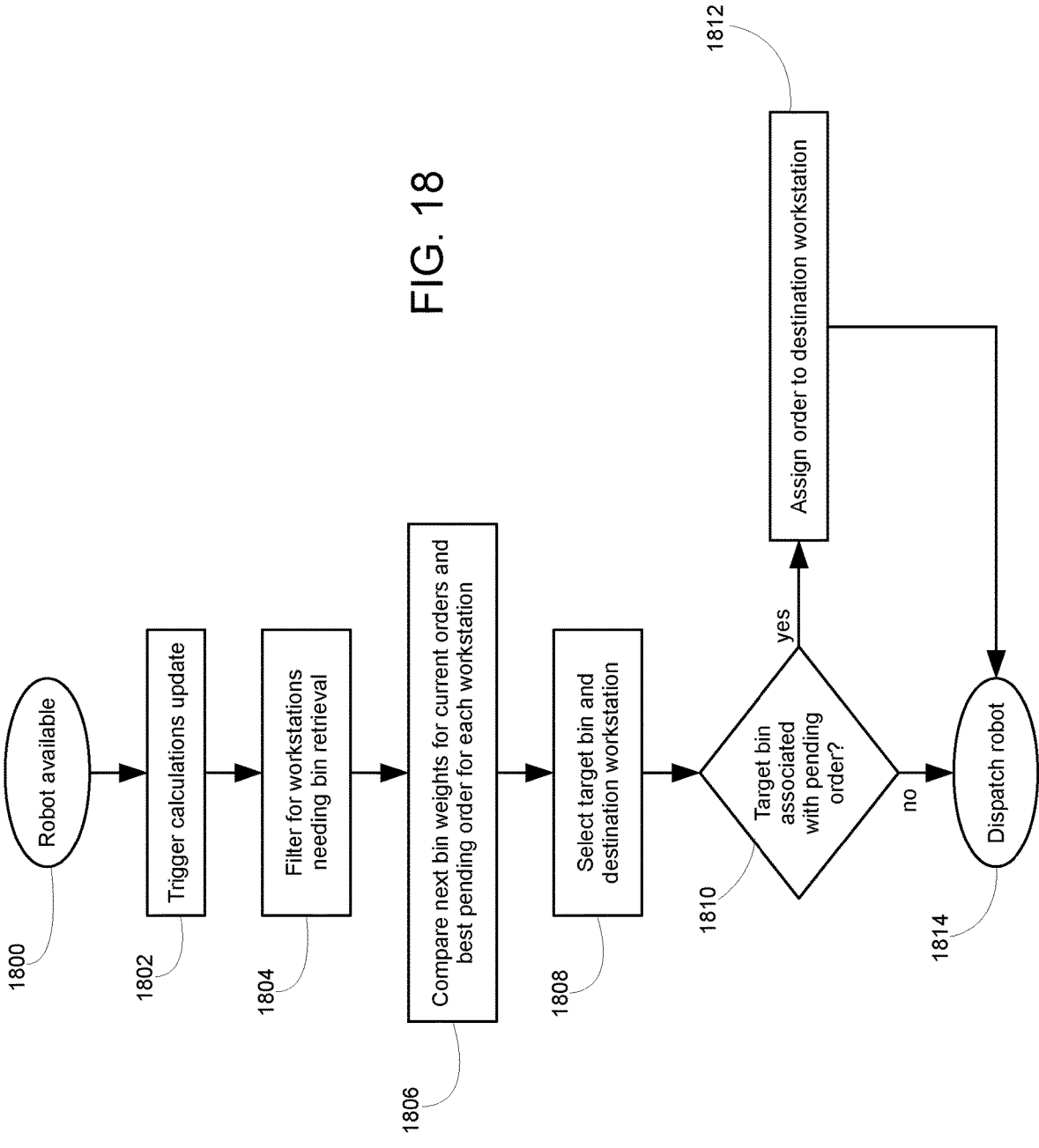
FIG. 18 shows a flowchart describing how a bin is selected for robot retrieval after a robot becomes available according to an exemplary embodiment.

FIG. 18 shows a flowchart describing how a bin is selected for robot 108 retrieval after a robot 108 becomes available according to an exemplary embodiment. The steps of FIG. 18 may be performed by the processors 1002 of the warehouse controller 102 executing the software instructions 908 loaded from the storage device 902. The steps of the flowchart are not restricted to the exact order shown, and, in other configurations, shown steps may be omitted or other intermediate steps added.

The process begins at step 1800 when a robot 108 becomes available. In some embodiments, a robot 108 is considered available when it is not assigned to move a bin 300 to any particular location, i.e., is not assigned to move bins to/from workstations 110. Further constraints on robot 108 availability may be include further requiring that the robot 108 is operating within normal parameters (i.e., not reporting damage) and is not due for inspection or other routine maintenance, etc.

At step 1802, the warehouse controller 102 triggers an update of the calculations process by running the flowchart starting at step 1500 shown in FIG. 15. Trigger the calculations to be performed right before assigning a robot 108 for a specific bin retrieval job beneficially ensures the bin selected for retrieval is optimal (e.g., highest weight) given all the possible choices of bins, workstation 110 and orders for which the robot 108 could be assigned. In some embodiments, to save time the calculations are performed in a manner where bin weights, order weights and next bins that are based on initial conditions such as bin contents and workstation 110 stock waitlists that have not changed since a last time the calculations were performed are not repeated.

At step 1804, the warehouse controller 102 filters the list of workstations 110 to determine which workstations 110 need a bin retrieval. In some embodiments, there may a predetermined limit of how many robots 108 may be simultaneously assigned to service each workstation 110. Thus, workstations 110 that already have some threshold number of robots 108 dispatched are not considered for a next available robot 108. Likewise, some workstations 110 may simply not need a bin retrieval such as due to already having dispatched robots 108 to retrieve all SKU items on the workstation's stock waitlists 918 or having no remaining items to order on the stock waitlist 918 due to have no currently assigned orders to process.

At step 1806, for each workstation 110 in the filtered list from step 1804, the warehouse controller 102 compares the next bin weight for the current orders with the next bin weight for the highest weighted pending order for that workstation 110. The next bin weight for the current orders assigned to the workstation 110 was calculated at step 1506 of FIG. 15. Likewise, the order weights and next bin weights for the various pending orders were calculated respectively at steps 1516 and 1518 of FIG. 15. The warehouse controller 102 at this step compares the highest bin weight for the current orders with the highest bin weight for the highest ranking pending order. This comparison is done for each of the workstations 110 in the filtered list of step 1804.

At step 1808, the warehouse controller 102 selects a target bin and destination workstation 110 to assign to the available robot 108 based on the results of step 1806. In some embodiments, the next bin with the highest ranking out of all the next bin weights compared at step 1806 is chosen as the target bin. This target bin will have such a high ranking when associated with either a current order or a pending order of a particular workstation 110 and this particular workstation 110 is selected by the controller as the destination workstation 110.

At step 1810, the warehouse controller 102 determines whether the target bin with the highest ranking was taken from the current orders already assigned to the workstation

110 or assuming a pending order was assigned to the workstation 110. In the event the target bin had its weight calculated at step 1506, this means the target bin is associated with a current order of the destination workstation 110 and control simply proceeds to step 1814 to dispatch the robot 108. However, in the event the target bin had its weight calculated at step 1518, this means the target bin only obtained such a high weight because of an assumption that a particular pending order was assigned to the workstation 110. In this case, control proceeds to step 1812 to actually assign that pending order to the workstation 110.

At step 1812, the warehouse controller 102 assigns the pending order determined at step 1810 to the destination workstation 110. Similar to step 1704 described above, in some embodiments this involves updating the workstation-to-order table 916 and also updating the WS-stock-waitlist 918 for the particular workstation 110. The warehouse controller 102 also sends information regarding the order assignment to the workstation controller 1000 in order to allow the workstation display device s 204 and put-spot indicators 212, 214 to instruct the picking agent to fulfil the order.

At step 1814, the warehouse controller 102 sends a command to the robot 108 to fetch the target bin from the bin storage facility 114 and deliver the target bin to the destination workstation 110. This step may also involve the warehouse controller 102 updating the stock waitlist 918 for the destination workstation 110 by removing each of the required stock-keeping units (SKUs) for which there is sufficient stock included in the target bin.

In some embodiments, the warehouse controller 102 continues to consider assigning new pending orders to the destination workstation 110 in order to maximize batch factor (i.e., items picked per bin presentation) taking into account bins that are scheduled to be delivered to the destination workstation 110 but the robot(s) 108 dispatched to move the bins have not yet arrived at the workstation 110. Furthermore, in some embodiments, the warehouse controller 102 further considers assigning new pending orders to the destination workstation 110 even for one or more bins that are current being picked from at the workstation 110. Leveraging bins 300 that are scheduled to arrive at a particular workstation 110 or that are already at the workstation 110 further increases efficiency of the system 100 especially in situations when it just so happens that a new pending order could be directly fulfilled by said already-scheduled bins 300. This is particularly beneficial for single-SKU orders, which are quite common in e-commerce application. However, the principle can also apply to multi-SKU orders in exactly the same way.

Figure 19:
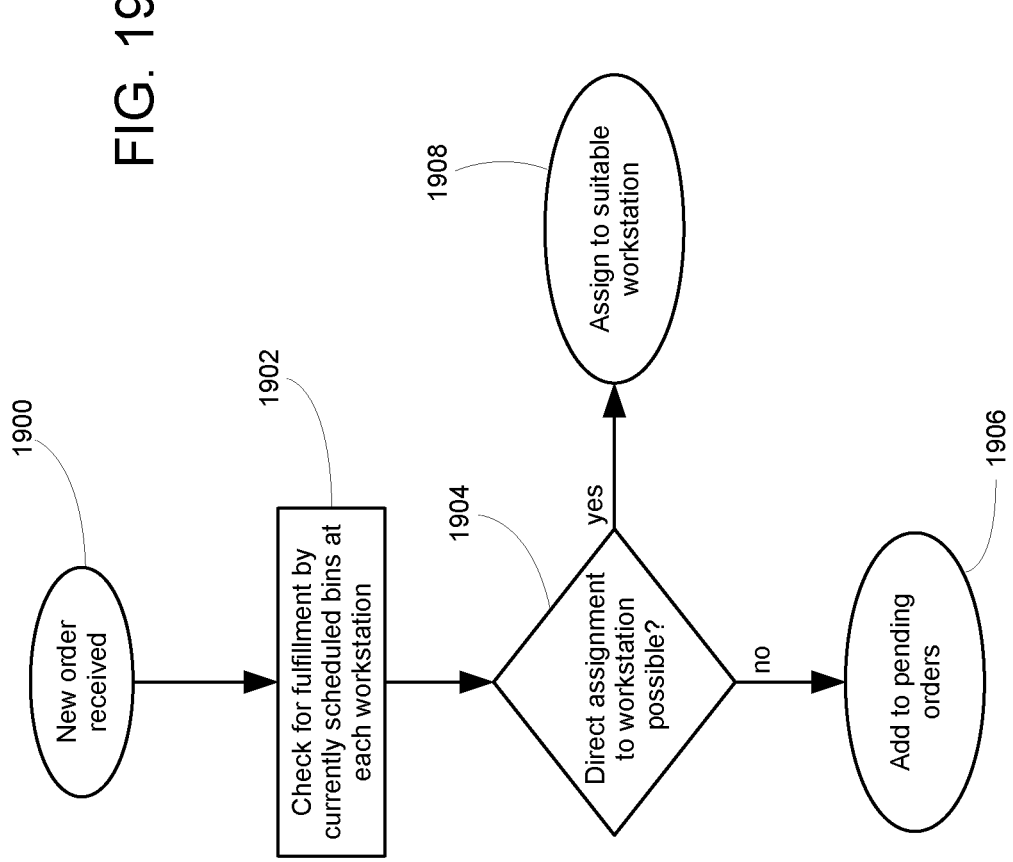
FIG. 19 shows a flowchart describing how a new order may be directly assigned to a workstation because the order be fulfilled at that workstation without requiring any additional bins to be moved to the workstation according to an exemplary embodiment.

FIG. 19 shows a flowchart describing how a new order may be directly assigned to a workstation 110 because the order be fulfilled at that workstation 110 without requiring any additional bins 300 to be moved to the workstation 110 according to an exemplary embodiment. The steps of FIG. 19 may be performed by the processors 900 of the warehouse controller 102 executing the software instructions 908 loaded from the storage device 902. The steps of the flowchart are not restricted to the exact order shown, and, in other configurations, shown steps may be omitted or other intermediate steps added.

The process begins at step 1900 each time a new order is received by the warehouse controller 102 from an order system 104. For instance, this may happen each time a customer makes an order via an online website or other e-commerce application.

At step 1902, for each workstation 110 in the system, the warehouse controller 102 checks to see if the order can be fulfilled by the same target bins that are already selected to be delivered to the workstation 110. This can be done by the workstation controller simply checking to see if the SKU quantities desired by the new order are contained in the bins 300 already scheduled to be delivered to each workstation 110 (taking into account SKU quantities that are also needed to fulfil the current orders assigned to each workstation 110).

At step 1904, the warehouse controller 102 determines whether direct assignment of the order to a particular one of the workstations 110 is possible. Direct assignment will be possible when the determination of step 1902 is positive meaning that the bins scheduled to be delivered to a particular workstation 110 (possibly including one or more bins that are currently being picked from at the workstation 110) contain sufficient stock of the SKUs desired by the new order. Furthermore, another requirement is that the workstation 110 have an available put-spot 208, 210. For single-SKU orders, this latter requirement for a put-spot may always be true because as soon as the singles put-spot 220's tote 210 fills up, the picking agent simply places it on the conveyer belt system 802 and grabs another unused tote 210 to use at the single-SKU put-spot 220. For multi-SKU orders, the warehouse controller 102 determines whether there is an empty multi-SKU put-spot 208 available on the workstation 110's put-wall 206.

If direct assignment is not possible either because the currently scheduled bins 300 for all workstations 110 are not sufficient to fulfil the order, or because no suitable workstation 110 has an empty put-spot 208, control proceeds to step 1906 to simply add the new order to the pending orders list 914. Alternatively, if direct assignment is possible, control proceeds to step 1908.

At step 1906, since directly assignment is not possible, the order is added to the pending orders table 914.

At step 1908, the warehouse controller 102 directly assigns the new order to a suitable workstation 110 determined at step 1904 such as by updating the workstation-to-order 916 table and also updating the WS-stock-waitlist 918 for the particular workstation 110. The warehouse controller 102 also sends information regarding the order assignment to the workstation controller in order to allow the workstation display device 204 and put-wall indicators 212, 214 to instruct the picking agent to fulfil the order In a sense, orders that are directly assigned in this manner can be fulfilled for "free" at the workstation 110 because no additional robot 108 bin movements will be required to fulfil the order. As previously mentioned, bin movements by the robots 108 are expensive operations in terms of time and thus it is very beneficial to maximize batch factors of the items picked per bin presentation and fulfil as many orders as possible at each workstation 110 from as few bins 300 as possible. Direct order assignment at this step greatly increases efficiency of the system 100.

An exemplary benefit of the workstation 110 design of FIG. 2 having one tote for single-SKU orders (Singles) and a put-wall of multi-SKU totes for multi-SKU orders (Multis) is that combined with the order assignment and bin selection processes described above is that no sortation is required. Here numerous orders with one item (Singles) are picked to a tote 210 and once completed are sent directly to packing 804 (orders with only one item need not be sorted). Furthermore, numerous multi-SKU orders are now simultaneously and discretely picked to their respective multi-tote 210, with each multi-tote 210 assigned to an end customer order. (i.e. the picking agent picks directly to the order tote).

In some embodiments (depending on SKU size) the warehouse controller 102 may be configured to deal with twelve multi orders at once for smaller products, but others may only have six if they are larger. In this way, orders are already sorted upon the pick (i.e., items are directly sorted to their respective order upon the pick) and once completed can be conveyed directly to shipping. In some embodiments, multi orders are opened and assigned to workstations 110 one by one as completed orders are completed and conveyed to packing 804.

In some embodiments, the warehouse controller 102 analyzes all of the orders within the pending order queue (pool of orders yet to be processed) to find the most ideal batch of orders to be processed in their designated, individual order totes (discrete number—twelve, in the case of workstation 110 layout of FIG. 2). In some embodiments, the workstation 110 is initialized by first assigning the highest weighted order based only on priority and hold time. Each of the remaining eleven multi orders to be assigned follow the above-described order assignment processes to maximize items picked per presentation/batch factor at each workstation 110.

Although there being significant benefits to picking directly to customer orders for multiple-SKU orders, other embodiments are also possible that still leverage automated sortation systems.

Figure 20:
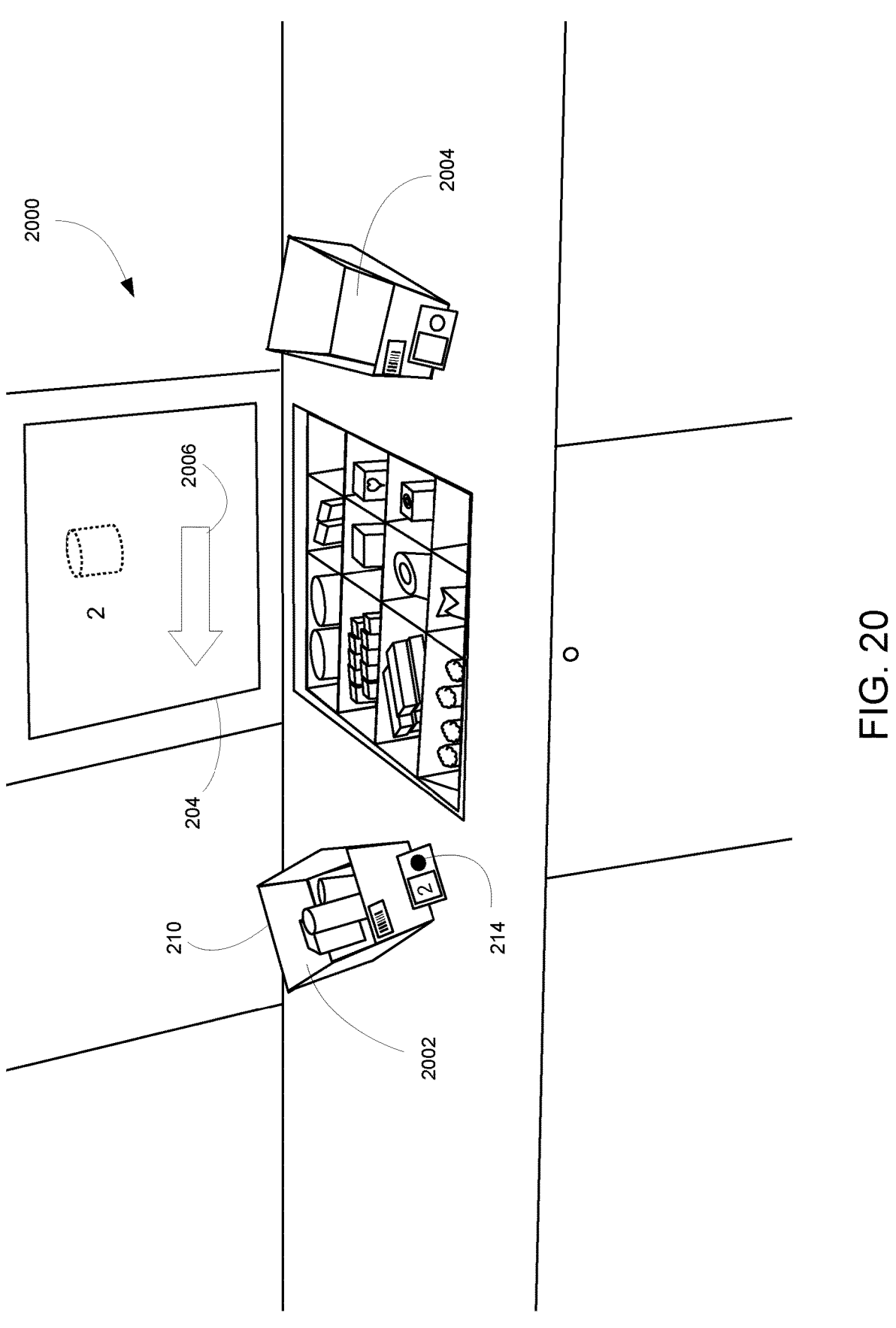
FIG. 20 illustrates a perspective view of dual put-spot picking workstations according to an exemplary embodiment.

FIG. 20 illustrates a perspective view of dual put-spot picking workstations 2000 according to an exemplary embodiment. This workstation 2000 design differs by simply having two put-spots: a) a multi-SKU put-spot 2002 for placing items picked for multi-SKU orders, and b) a single-SKU put-spot 2004 for placing items picked for single-SKU orders.

In this embodiment, the workstation 110 display instructs the picking agent of which of the two put-spots 2002, 2004 each picked item it to be placed. This may be done by arrows 2006 or other indicators such as the illuminated lights 214 on the pick-spot itself, for example.

The dual put-spot workstation 2000 design of FIG. 20 is particularly beneficial for fulfilment centers that have already invested in an automated sortation system or applications that require a high number of open orders to be processed at once. For such fulfillment centers, rather than completely redesigning floor plan layouts and disposing of existing, expensive sortation systems, efficiency can instead by greatly increased by the incorporation of the bin selection and order assignment strategies disclosed herein in combination with a workstation 2000 design as set forth in FIG. 20.

Single-SKU order assignment and picking occurs generally the same as described for the previous embodiments. Items for single-SKU orders are picked at the workstation 110 at placed into the tote 210 at the single-SKU put location 2002. When the tote 210 fills, the tote 210 is placed on a conveyer belt system 802 for deliver to a packing station 810.

Multi-SKU order assignment to workstations 110 also occurs substantially the same as described for the previous embodiments but there are a couple changes. Rather than continually assigning orders to workstation 110 in a waveless manner as long as there are available put-spots 208 at the workstation 110, the warehouse controller 102 in this embodiment instead assigns a predetermined batch of multi-SKU orders of a fixed number, as per the capabilities of the automated fulfilment system. The order assignment can be done in the same way as previously described by simply treating the put-spots 208 as now being virtual spots rather than actual spots and by limiting the total number of separate multi-SKU orders to a predetermined number. In this way, the picking jobs are spread amongst the workstations 110 and bin moves are reduced in the same as previously described. Further, downstream sortation systems can dynamically assign the orders contained in the multi-order bin as this predetermined number of put spots becomes available.

The picking agent at the workstation 2000 picks items for all multi-SKU orders and places them into the tote 210 at the multi-SKU put-spot 2004 as per the display screen 204 instructions. When the multi-SKU put-spot 2004's tote 210 is full, the picking agent places the tote 210 on the conveyer belt system 802 where it is moved to the sortation stage 2102 instead of the packing stage (sese FIG. 21). There is no need in this embodiment for the picking agent to assemble complete multi-SKU orders for packing as the automated sortation system takes care of the sortation.

Figure 21:
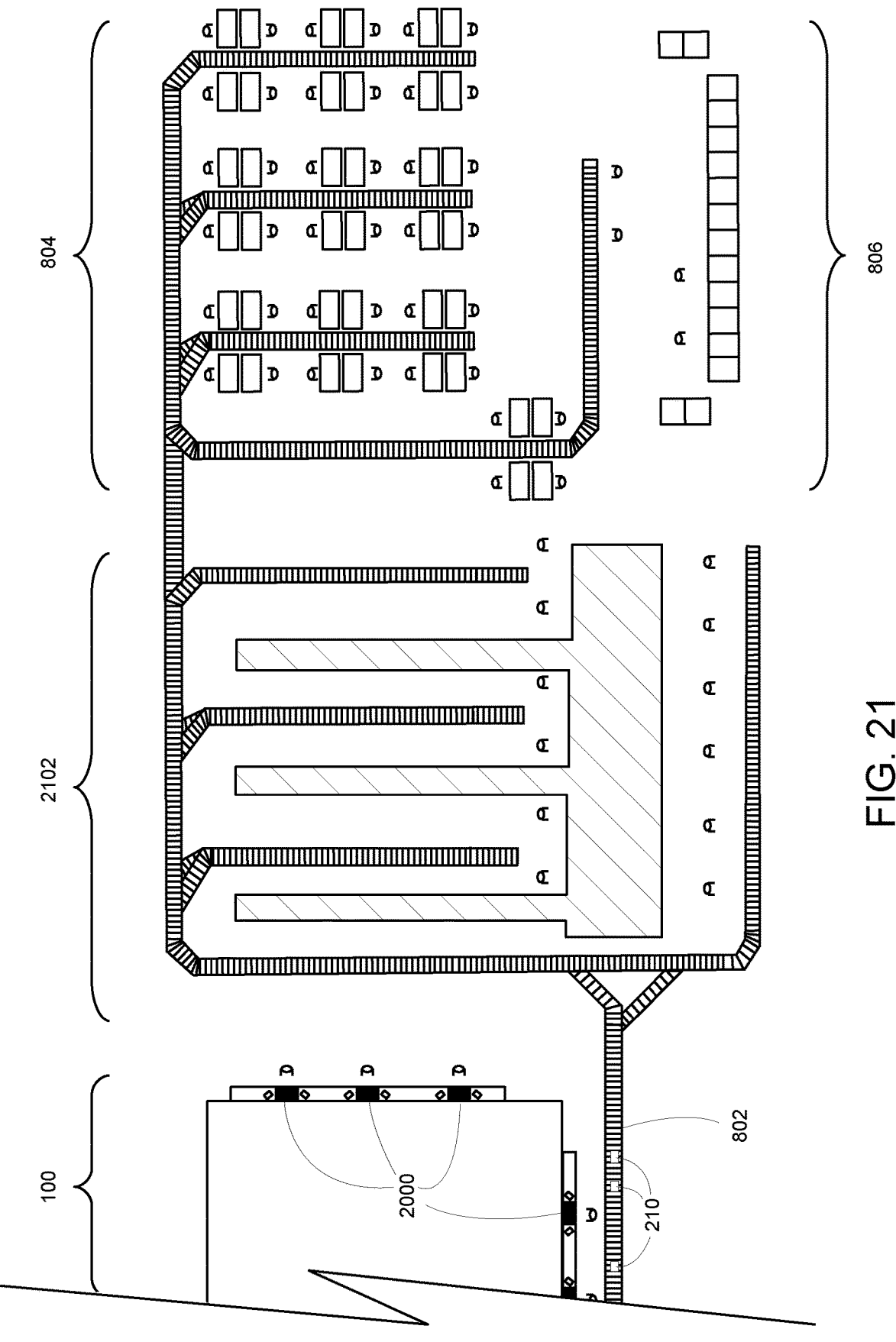
FIG. 21 illustrates plan view of an order fulfillment system including an automated sortation system for sorting multi-SKU totes from the workstation of FIG. 20 according to an exemplary embodiment of the present invention.

FIG. 21 illustrates plan view of an order fulfillment system 2100 including an automated sortation system 2102 for sorting multi-SKU totes 210 from the workstation 2000 of FIG. 20 according to an exemplary embodiment of the present invention. In this embodiment, the order fulfillment system 2100 includes the automated storage and retrieval system 100 of FIG. 1 as a first stage, along with a conveyer belt system 802 for moving picked items in totes 210 from the workstations 110 to a selected one of a sortation stage 2104, a packing stage 804 and a shipping stage 806.

As before, the bin storage facility 114 has picking workstations 110 on two sides. These workstations 110 may be of the configuration shown in FIG. 20 or may be a combination of both the configurations of FIG. 2 and FIG. 20. The conveyer belt system 802 is adjacent the picking stations such that picking agents working in the stations can easily place completed totes 210 onto the conveyer belt system 802. The conveyer belt system 802 transports the totes 210 to suitable destinations. For instance, completed multi-SKU put spot 2004 totes 210 from the workstation 2000 of FIG. 20 are transported to the automated sortation system 2102. From the automated sortation system 2102, the conveyer belt system 802 moves the sorted groups to the packing stage 804. Parcels are then placed back onto the conveyer belt system 802 where they are automatically transported to the shipping stage 806.

An exemplary benefit of the workstation 2000 design of FIG. 20 having one put-spot 2002 for Singles plus one put spot 2004 for Multis is to leverage existing automated sortation systems 2102. Here, orders with one item (Singles) are picked to a tote 210 and once completed sent directly to packing 804 (items with only one order need not be sorted). Orders with multiple items (Multis) are picked to another tote 210 and once all orders are complete the tote 210 is conveyed to a downstream sortation system 2102 to get sorted to their designated orders before getting conveyed to packing 804. Some embodiments may use a discrete number of orders per multi order batch (i.e. sixty orders) for processing. Other times this may be arbitrary depending on workflow.

In some embodiments, the warehouse controller 102 analyzes all of the orders within the pending order queue (pool of orders yet to be processed) to find the most ideal batch of orders to be processed together in one tote (discrete number—sixty, in one example). In some embodiments, the workstation 110 is initialized by first assigning the highest weighted order based only on priority and hold time. Each of the remaining fifty-nine orders are assigned following the above-described order assignment processes to maximize items picked per presentation/batch factor at each workstation 110.

In summary of an exemplary embodiment, an automated storage and retrieval system stores multi-stock bins 300 each holding different stock-keeping units (SKUs). Records dynamically track which SKUs are in each bin 300. A controller 102 tracks a stock waitlist 918 indicating quantities of SKUs still required to be delivered to a workstation 110 in order to fulfil current orders assigned to the workstation 110. When a robot 108 is available, the controller selects a multi-stock bin that has a highest number of unique ones of the required SKUs indicated on the stock waitlist 918 and commands a robot 108 to fetch and deliver the selected bin to the workstation 110. For new orders, the controller may determine if direct assignment can be done to a workstation 110 without additional bins 300 being scheduled. For other pending orders, the controller may assume each pending order is assigned to the workstation 110 and then pick the order that would require a lowest number of bins 300 to be delivered to the workstation 110.

An exemplary benefit of some embodiments of the invention is that whenever possible the system optimizes for batch factor meaning that as may items and orders are fulfilled at the picking workstations 110 with a few as possible bin 300 retrievals being carried out by the robot(s) 108 of the automated storage and retrieval system 100. However, the system 100 as disclosed is flexible and need not be limited to only or always selecting bins 300 and assigning orders with a goal to maximize batch factor. The techniques disclosed herein may all be modified as required to still utilize and/or take into account an "inventory selection strategy" traditionally utilized in the prior art. In particular, bin weights and order weights as disclosed herein may take into account or otherwise be based on other inventory selection strategies besides batch factor. Examples include:

Lowest inventory—This has an effect that it tries to keep bins from all having 1 or two items. Bins with fewer items get used first to free up empty compartments to store new inventory.

Highest inventory—This mode has an effect that inventory is still spread throughout the system. However, has a performance hit when running low on inventory in that there are lots of bins with 1 or two items.

Oldest inventory—Sometimes called FIFO (first in first out), this picks the oldest replenished items in the system over newer. This is needed for grocery applications to limit spoilage.

Newest Inventory—This is LIFO, where the newest items get picked first. Can be useful if the customer prefers to send the newest product to the customer, such as if eventually old product will be rotated out.

In some embodiments, the system 100 and above-described calculation process and bin/order assignments are dynamic. Even though a bin 300 may be previously the next bin optimal for a particular workstation 110 or operation, other workstations 110 or operations can later select the same bin if it is later preferred for their tasks. As a result, bins are checked to see if the bin contents have changed before assignment to a workstation 110. If the bin has not moved, then this is easy: no change. If the bin was moved, the calculations process checks to see if the inventory change in the bin negatively affects the desired outcome. If the bin previously undergoes a picking operation, where the SKUs removed are not associated with the desired outcome, then the change does not impact the outcome and the bin can be used. If the SKUs removed negatively impact operation (i.e. inventory depletion causes multiple bins now to be called, batch factor/items picked per bin presentation suffers), a new bin may need to be selected that optimizes the desired outcome. If decant/cycle count operations are performed, the inventory may stay the same or increase and the bin check is performed to validate this before committing the bin to a workstation operation.

In some embodiments, as any condition of the system 100 changes that impacts efficiency, the warehouse controller 102 continually recalculate the order processing logic to ensure optimal performance. First, when optimal bin sets are calculated and used in downstream operations, the warehouse controller 102 continually checks if the optimal bin set inventory status has changed. If the inventory levels have changed before the bin pick task is assigned to a robot 108, the controller dynamically verifies that the items picked per bin presentation (batch factor) is not compromised. If so, the controller recomputes the optimal bins for the order. Second, the controller 102 also recomputes bin selection and workstation 110 order batching weights continually as the system status changes. As orders are assigned to workstations 110, the controller 102 continually recalculates how this impacts the parameters of the orders still within the processing queue to optimize the items picked per bin presentation (batch factor) of subsequent order assignments.

Different aspects of the above described features may be utilized in combination or separate in different embodiments. For example, some embodiments only use bin selection to maximize batch factor as described herein while assigning orders to workstations 110 only by priority. These embodiments may be beneficial in some application to assigns orders to workstations 110 to ensure that the highest priority items are processed first always. Hold time and items picked per bin presentation are not considered when assigning orders to picking workstations 110 in some embodiments. Bin selection is used to calculate the best bin set to use to fulfill the assigned order, however, to maximize items picked per bin presentation, which reduces bin move operations by the robots 108 and helps with efficiency.

In another example, both bin selection and order assignment batching are used together in combination. This is the workflow that would be used during order assignment to a workstation 110 to maximize efficiency/performance while meeting service level agreements (SLAs—dictated by priority and hold time). In some embodiments, batch factor (items picked per bin presentation), hold time and priority are all considered to varying degrees (each can be weighed depending on customer preference).

In some embodiments, the controller 102 changes the preference of priority, hold time and batch factor depending on the time of day and goals of the customer. In some embodiments, the controller 102 monitors IPP and, if it is not high enough and there are no high priority orders, the controller 102 dynamically assigns workers to perform other tasks until IPP is increased or cut off times are threatened. If cut off times are threatened, the controller 102 may change the weight factors to favor the hold time factor above the batch factor to ensure orders are picked and packed in time to meet the shipping cut off time. These features are beneficial in some embodiments to give warehouse operators operational flexibility to maximize productivity of the system 100 in an application-tailored manner.

In some embodiments, a picking workstation 110 allows numerous multi-orders to be opened and grouped together to achieve the highest items picked per bin presentation (batch factor), while appending complimentary single orders that boost items picked per bin presentation (batch factor). The algorithm works in tandem to maximize items picked per bin presentation (batch factor). Exemplary benefits of some embodiments include:

a) Order batching items picked per bin presentation (batch factor) gains: prioritize order processing queue and order assignment to workstations 110 considering the items picked per bin presentation (batch factor) gain of each order in the queue when processing alongside open orders at each workstation 110.

b) Bin selection items picked per bin presentation (batch factor) gain: select bins to fulfill order based on maximum items picked per bin presentation (batch factor) gains by considering all open orders at a workstation 110 and the contents of all bins in the ASRS.

In some embodiments, the above benefits allow the system to process more orders and/or reduce the robot 108 fleet workload accordingly. Other examples of advantages achieved by some embodiments include overall increases of batch factor, increased fulfillment velocity, lowered robot 108 fleet requirements, best performance gains achieved when the pending order queue is larger (more orders to choose from when optimizing order batching leads to higher batch factor), which is ideal for real world e-commerce. Furthermore, the system is dynamic and adapts to changing conditions of modern commerce.

Embodiments of the system may be implemented in different applications such as e-commerce and microfulfillment applications. As described above, as e-commerce orders are low affinity, high SKU variety and customer service expectations are increasing, and embodiments herein help maximize efficiency under these conditions. Microfulfillment requires a number of smaller, more distributed fulfillment centers and the efficiency/cost gains in some embodiments disclosed herein of eliminating the sortation system requirements and reducing robot 108 fleet requirements lower the barrier to entry.

Although the invention has been described in connection with preferred embodiments, it should be understood that various modifications, additions and alterations may be made to the invention by one skilled in the art without departing from the spirit and scope of the invention. For example, although the above-description has focused on a e-commerce for illustration purposes, the present invention is equally applicable to any application that requires automated storage and retrieval systems such as warehousing, manufacturing, logistics.

Although the examples above have focused on systems 100 having a plurality of robots 108 for bin retrieval, other embodiments are also possible where there is a single robot 108. Likewise, systems in some embodiments may have a single picking workstation 110.

Although one put-wall 206 having a plurality of twelve multi-SKU put-spots 208 was illustrated above in FIG. 2, each picking workstation 110 in other embodiments may have other numbers of put-walls and put-spots thereon. For example, a workstation 110 may have a plurality of put-walls, each with any desired number of put-spots.

Although the picking agents working in each workstation 110 are described above as being human employees, in other embodiments, the picking agents may be robots. A combination of different types of picking agents, either human or robotic, may be utilized in a single system. The order assignment weight the controller utilized to assign orders to workstations 110 may also take into account the type of items (SKU) and the type of picking agent. Certain SKUs may be better suited for human picking agents and certain SKUs may be better suited for robotic picking agents. This factor can be taken into account in addition to batch factor, priority, hold time, etc.

Although, the above description has focused on bins stored in the bin storage facility 114 and totes utilized to hold picked items, these terms are utilized in a very inclusive manner for description purposes. Both the terms bin and tote are utilized hereinto to simply refer to storage containers. The bins and totes may be implemented using any suitable type of storage container such bins, totes, carts, bags, boxes, flats, buckets, and other holders. For example, in some cases, rather than picking to totes 210 being hard-walled containers as illustrated in FIG. 2, the totes 210 to which items are picked may be shopping bags branded by the store from which the item is being purchased.

The calculation process of FIG. 15 may be modified in some embodiments such that, instead of minimum bin sets in steps 1504 and 1512, the warehouse controller 102 instead determine any desired bin set such as utilizing inventor selection strategy to include specific bins in the set.

As an example, FIG. 16 may be modified to determine a bin set that may or may not be the minimum bin set by selecting bins that have the most items that could be picked regardless of SKU counts. For instance, steps 1610 and 1612 may be modified such that the controller looks for a bin that has a highest number of items picked as a best bin. Differentiating total number of items picked from the bin versus SKU count per bin may be beneficial in some embodiments to maximize productivity. For example, a bin may have only a relatively low number of SKUs, but regardless a high number of units picked total so that bin would have a higher weight and be selected at step 1610 and added to the minimum bin set at 1612. Different combinations of selection of best bin at steps 1610 and 1612 to either maximize items picked pre bin or SKUs picked per bin may be utilized in different embodiments. Other weighting factors may also be utilized in other embodiments.

The above-described flowchart algorithms and other functionality as described herein may be implemented by software executed by one or more processors operating pursuant to instructions stored on a tangible computer-readable medium such as a storage device. Examples of the tangible computer-readable medium include optical media (e.g., CD-ROM, DVD discs), magnetic media (e.g., hard drives, diskettes), and other electronically readable media such as flash storage devices and memory devices (e.g., RAM, ROM). The computer-readable medium may be local to the computer executing the instructions, or may be remote to this computer such as when coupled to the computer via a computer network such as the Internet. The processors may be included in a general-purpose or specific-purpose computer that becomes the warehouse controller 102, workstation controller or any of the above-described controllers as a result of executing the instructions.

In other embodiments, rather than being software modules executed by one or more processors, the flowcharts and described-functionality may be implemented as hardware modules configured to perform the above-described functions. Examples of hardware modules include combinations of logic gates, integrated circuits, field programmable gate arrays, and application specific integrated circuits, and other analog and digital circuit designs.

Functions of single modules may be separated into multiple units, or the functions of multiple modules may be combined into a single unit. For example, the warehouse controller 102 and the workstation controller may be combined in some embodiments to be a single controller. Likewise, the system may have other controllers such as a robot controller that handles the robots 108.

Unless otherwise specified, features described may be implemented in hardware or software according to different design requirements. In addition to a dedicated physical computing device, the word "server" may also mean a service daemon on a single computer, virtual computer, or shared physical computer or computers, for example. All combinations and permutations of the above described features and embodiments may be utilized in conjunction with the invention.

What is claimed is:

1. An automated storage and retrieval system comprising:
a bin storage facility having a plurality of bins physically stored therein, the bins in the bin storage facility being multi-stock bins that hold stock for a plurality of different stock-keeping units (SKUs);
a data storage device having a plurality of records electronically stored therein, the records indicating stock-keeping units (SKUs) for which there is stock in each bin;
a plurality of workstations at each of which a picking agent picks stock from the bins delivered thereto, in order to fulfill current orders assigned thereto;
a plurality of robots for fetching the bins from the bin storage facility and delivering the bins to the workstations; and
a controller configured to:
track a stock waitlist for each of the workstations, the stock waitlist indicating quantities required stock-keeping units (SKUs) still required to be delivered to each of the workstations in order to fulfill the current orders assigned thereto;
receive pending orders from an order system, each of the pending orders specifying quantities of desired stock-keeping units (SKUs);
for each pending order, determine a workstation, based on the stock waitlist corresponding to each of the workstations, to assign the pending order, such that the number of bins required to be delivered to the workstation to fulfill the pending order is minimized;
calculate order weights respectively corresponding to each of the pending orders, and wherein the order weights are calculated as a function of a number of bins that would need to be delivered to the workstation assuming the pending order is assigned to the workstation, items picked per bin presentation (IPP), a predetermined global factor for IPP, current processing time for an order, a predetermined global factor for current processing time, order priority, and a predetermined global factor for order priority; and
compare the order weights of the pending orders and assign a highest-weighted pending order to the workstation.

2. The automated storage and retrieval system of claim 1, wherein the controller is further configured to:
determine available workstations having an available put position;
calculate the plurality of order weights respectively corresponding to the pending orders at each of the available workstations, at least some of the order weights being calculated by the controller assuming a respective one of the pending orders is assigned to each available workstation and then determining a minimum bin set for each available workstation assuming the respective pending order is assigned to each available workstation;

compare the order weights of the pending orders at each of the available workstations;

assign a particular pending order to an available workstation at which the particular pending order has a highest order weight; and update the stock waitlist for the available workstation by adding quantities of each of the desired stock-keeping units (SKUs) specified in the particular pending order.

3. The automated storage and retrieval system of claim 1, wherein the controller is further configured to:

receive a pending single order from the order system, the pending single order specifying a quantity of a single desired stock-keeping unit (SKU);

determine whether one or more scheduled bins that have been scheduled to be delivered to the workstation by the robot include sufficient quantity of the single desired stock-keeping unit (SKU) to meet both the single order and the stock waitlist for the workstation; and directly assign the pending single order to the workstation when the one or more scheduled bins include sufficient quantity of the single desired stock-keeping unit (SKU) to meet both the single order and the stock waitlist for the workstation.

4. The automated storage and retrieval system of claim 1, wherein the controller is further configured to:

determine possible source bin sets, wherein, for each unique stock-keeping unit (SKU) on the stock waitlist for the workstation, the controller is configured to determine a possible source bin set including bins in the bin storage facility that contain sufficient stock of the required unique stock-keeping units (SKU) as per the stock waitlist; and select a most frequently occurring source bin across the possible source bin sets as the selected bin.

5. The automated storage and retrieval system of claim 1, wherein the controller is further configured to update the stock waitlist for the workstation by adding quantities of each of the desired stock-keeping units (SKUs) specified in the highest-weighted pending order.

6. The automated storage and retrieval system of claim 1, wherein:

each of the current orders assigned to the workstation respectively represents a complete order to be shipped as a single package to a destination address; and the controller sends commands to a conveyer belt system to transport a completed tote containing picked items for each of the current orders assigned to the workstation to a packing station.

7. The automated storage and retrieval system of claim 1, wherein:

each of the current orders assigned to the workstation respectively represents a partial order; and the controller sends commands to a conveyer belt system to transport a completed tote containing picked items for each of the current orders assigned to the workstation to a sortation system.

8. The automated storage and retrieval system of claim 1, wherein the controller is further configured to:

determine a workstation bin set representing bins that together contain sufficient quantities of stock of the required stock-keeping units (SKUs) to fulfill the stock waitlist for the workstation;

calculate a plurality of bin weights respectively corresponding to each bin of the workstation bin set, wherein said bin weights are calculated as a function of said items picked per bin presentation (IPP), said predetermined global factor for IPP, said current processing time for an order, said predetermined global factor for current processing time, said order priority, and said predetermined global factor for order priority;

compare the bin weights of the workstation bin set; and send a command to the robot to fetch a highest-weighted bin from the bin storage facility and deliver the highest-weighted bin to the workstation.

9. The automated storage and retrieval system of claim 8, wherein the controller is further configured to calculate at least some of the bin weights such that a first bin has a higher bin weight than a second bin when the controller determines that delivery of the first bin to the workstation would fulfill a greater number of unique stock-keeping units (SKUs) on the stock waitlist for the workstation than if the second bin were delivered to the workstation.

10. The automated storage and retrieval system of claim 1, wherein the controller is further configured to:

calculate at least some of the order weights by assuming a respective one of the pending orders is assigned to the workstation and then determining a minimum bin set for the workstation assuming the respective pending order is assigned to the workstation;

wherein the minimum bin set for the workstation is a minimum number of bins of the bin storage facility that would need to be delivered to the workstation to fulfill both the pending orders assumed assigned to the workstation along with the stock waitlist for the workstation; and wherein the controller calculates the order weights for the pending orders such that a first pending order has a higher order weight than a second pending order when the controller determines that assigning the first pending order to the workstation would require a lower number of bins to be delivered to the workstation than if the second pending order were assigned to the workstation.

11. The automated storage and retrieval system of claim 10, wherein the controller is further configured to determine the minimum bin set for the workstation assuming a particular pending order is assigned to the workstation by an iterative process including a plurality of steps as follows:

forming a potential stock waitlist for the workstation, the potential stock waitlist indicating both quantities of the required stock-keeping units (SKUs) still required to be delivered to the workstation in order to fulfill the current orders assigned to the workstation along with quantities of the desired stock-keeping units (SKUs) that would further be required to be delivered to the workstation if the particular pending order were assigned to the workstation;

determining one or more potential source bin sets, wherein, for each unique stock-keeping unit (SKU) on the potential stock waitlist, the controller is configured to determine a potential source bin set indicating bins in the bin storage facility that contain sufficient quantity stock as required by the potential stock waitlist;

selecting a most frequently occurring source bin across the potential source bin sets and adding the most frequently occurring source bin to the minimum bin set;

removing each unique stock-keeping (SKU) from the potential stock waitlist that is now met by the minimum bin set; and repeating the iterative process until there are no further stock-keeping units (SKUs) on the potential stock waitlist.

12. The automated storage and retrieval system of claim 1, wherein the controller is further configured to:

select a bin of the bin storage facility as a selected bin, the selected bin being a multi-stock bin that contains the stock for a highest number of required unique stock-keeping units (SKUs) indicated on the stock waitlist corresponding to the workstation;

send a command to a robot selected from amongst said plurality of robots to fetch the selected bin from the bin storage facility and deliver the selected bin to the workstation;

update the stock waitlist for the workstation by removing each of the unique required stock-keeping units (SKUs) for which there is sufficient stock included in the selected bin.

13. The automated storage and retrieval system of claim 12, wherein, after updating the stock waitlist for the workstation by adding quantities of each of the desired stock-keeping units (SKUs) specified in the highest-weighted pending order, the controller is further configured to:

select a second bin of the bin storage facility as a second selected bin, the second selected bin containing stock for a new greatest number of unique required stock-keeping units (SKUs) indicated on the stock waitlist;

send a second command to the robot to fetch the second selected bin from the bin storage facility and deliver the second selected bin to the workstation; and update the stock waitlist for the workstation by removing each of the required stock-keeping units (SKUs) for which there is sufficient stock included in the second selected bin.

14. The automated storage and retrieval system of claim 13, wherein the controller is further configured to:

select a third bin of the bin storage facility as a third selected bin, the third selected bin containing stock to fulfill an oldest order currently assigned to the workstation;

send a third command to the robot to fetch the third selected bin from the bin storage facility and deliver the third selected bin to the workstation; and update the stock waitlist for the workstation by removing each of the required stock-keeping units (SKUs) for which there is sufficient stock included in the third selected bin.

15. The automated storage and retrieval system of claim 14, wherein the controller is further configured to:

select a fourth bin of the bin storage facility as a fourth selected bin, the fourth selected bin containing stock to fulfill a highest priority order currently assigned to the workstation;

send a fourth command to the robot to fetch the fourth selected bin from the bin storage facility and deliver the fourth selected bin to the workstation; and update the stock waitlist for the workstation by removing each of the required stock-keeping units (SKUs) for which there is sufficient stock included in the fourth selected bin.

16. The automated storage and retrieval system of claim 15, wherein the controller is further configured to:

select a fifth bin of the bin storage facility as a fifth selected bin according to an inventory selection strategy, said inventory selection strategy comprising lowest inventory, highest inventory, oldest inventory, and newest inventory;

send a fifth command to the robot to fetch the fifth selected bin from the bin storage facility and deliver the fifth selected bin to the workstation; and update the stock waitlist for the workstation by removing each of the required stock-keeping units (SKUs) for which there is sufficient stock included in the fifth selected bin.

17. A method of controlling a robot in an automated storage and retrieval system, the method comprising:

storing a plurality of records indicating stock-keeping units (SKUs) for which there is stock in each bin of a bin storage facility having a plurality of bins physically stored therein, the plurality of the bins in the bin storage facility being multi-stock bins that hold stock for a plurality of different stock-keeping units (SKUs);

tracking a stock waitlist for a plurality of workstations, the stock waitlist indicating quantities of required stock-keeping units (SKUs) still required to be delivered to each of the workstations in order to fulfill the current orders assigned to the thereto, the workstations being locations at which a picking agent picks stock from the bins of the bin storage facility in order to fulfill the current orders assigned thereto;

receive pending orders from an order system, each of the pending orders specifying quantities of desired stock-keeping units (SKUs);

for each pending order, determine a workstation, based on the stock waitlist corresponding to each of the workstations, to assign the pending order, such that the number of bins required to be delivered to the workstation to fulfill the pending order is minimized;

calculate order weights respectively corresponding to each of the pending orders, and wherein the order weights are calculated as a function of a number of bins that would need to be delivered to the workstation assuming the pending order is assigned to the workstation, items picked per bin presentation (IPP), a predetermined global factor for IPP, current processing time for an order, a predetermined global factor for current processing time, order priority, and a predetermined global factor for order priority; and compare the order weights of the pending orders and assign a highest-weighted pending order to the workstation.

18. The method of claim 17, further comprising:

calculating at least some of the order weights by assuming a respective one of the pending orders is assigned to the workstation and then determining a minimum bin set for the workstation assuming the respective pending order is assigned to the workstation;

wherein the minimum bin set for the workstation is a minimum number of bins of the bin storage facility that would need to be delivered to the workstation to fulfill both the respective one of the pending orders assumed assigned to the workstation along with the stock waitlist for the workstation; and calculating the order weights for the pending orders such that a first pending order has a higher order weight than a second pending order when determining that assigning the first pending order to the workstation would require a lower number of bins to be delivered to the workstation than if the second pending order were assigned to the workstation.

19. The method of claim 17, further comprising determining the minimum bin set for the workstation assuming a particular pending order is assigned to the workstation by an iterative process including a plurality of steps as follows:

forming a potential stock waitlist for the workstation, the potential stock waitlist indicating both quantities of the required stock-keeping units (SKUs) still required to be delivered to the workstation in order to fulfill the current orders assigned to the workstation along with quantities of the desired stock-keeping units (SKUs) that would further be required to be delivered to the workstation if the particular pending order were assigned to the workstation;

determining potential source bin sets, by determining, for each unique stock-keeping unit (SKU) on the potential stock waitlist, a potential source bin set indicating bins in the bin storage facility that contain sufficient quantity of stock as required by the potential stock waitlist;

selecting a most frequently occurring source bin across the potential source bin sets and adding the most frequently occurring source bin to the minimum bin set;

removing each unique stock-keeping (SKU) from the potential stock waitlist that is now met by the minimum bin set; and repeating the iterative process until there are no further stock-keeping units (SKUs) on the potential stock waitlist.

20. The method of claim 17, further comprising:

determining available workstations having an available put position, from amongst the plurality of workstations;

calculating the plurality of order weights respectively corresponding to the pending orders at each of the available workstations, at least some of the order weights being calculated by assuming a respective one of the pending orders is assigned to each available workstation and then determining a minimum bin set for each available workstation assuming the respective pending order is assigned to each available workstation;

comparing the order weights of the pending orders at each of the available workstations;

assigning a particular pending order to a corresponding one of the available workstation at which the particular pending order has a highest order weight; and updating the stock waitlist for the corresponding one of the available workstations by adding quantities of each of the desired stock-keeping units (SKUs) specified in the particular pending order.

21. The method of claim 17, further comprising:

receiving a pending single order from the order system, the pending single order specifying a quantity of a single desired stock-keeping unit (SKU);

determining whether one or more scheduled bins that have been scheduled to be delivered to the workstation by the robot include sufficient quantity of the single desired stock-keeping unit (SKU) to meet both the single order and the stock waitlist for the workstation; and directly assigning the pending single order to the workstation when the scheduled bins include sufficient quantity of the single desired stock-keeping unit (SKU) to meet both the single order and the stock waitlist for the workstation.

22. The method of claim 17, further comprising:

determining possible source bin sets, by determining, for each unique stock-keeping unit (SKU) on the stock waitlist for the workstation, a possible source bin set including bins in the bin storage facility that contain sufficient stock of that unique stock-keeping unit (SKU) as required by the stock waitlist; and selecting a most frequently occurring source bin across the possible source bin sets as the selected bin.

23. The method of claim 17, further comprising updating the stock waitlist for the workstation by adding quantities of each of the desired stock-keeping units (SKUs) specified in the highest-weighted pending order.

24. The method of claim 17, wherein:

each of the current orders assigned to the workstation respectively represents a complete order to be shipped as a single package to a destination address; and wherein the method further comprises sending commands to a conveyer belt system to transport a completed tote containing picked items for each of the current orders assigned to the workstation to a packing station.

25. The method of claim 17, wherein:

each of the current orders assigned to the workstation respectively represents a partial order; and wherein the method further comprises sending commands to a conveyor belt system to transport a completed tote containing picked items for each of the current orders assigned to the workstation to a sortation system.

26. The method of claim 17, further comprising:

determining a workstation bin set representing bins that together contain sufficient quantities of stock of the required stock-keeping units (SKUs) to fulfill the stock waitlist for the workstation;

calculating a plurality of bin weights respectively corresponding to each bin of the workstation bin set;

comparing the bin weights of the workstation bin set, as a function of said items picked per bin presentation (IPP), said predetermined global factor for IPP, said current processing time for an order, said predetermined global factor for current processing time, said order priority, and said predetermined global factor for order priority;

comparing the bin weights of the workstation bin set; and sending a command to the robot to fetch a highest-weighted bin from the bin storage facility and deliver the highest-weighted bin to the workstation.

27. The method of claim 26, further comprising calculating at least some of the bin weights such that a first bin has a higher bin weight than a second bin when determining that delivery of the first bin to the workstation would fulfill a greater number of unique stock-keeping units (SKUs) on the stock waitlist for the workstation than if the second bin were delivered to the workstation.

28. The method of claim 17, further comprising:

selecting a bin of the bin storage facility as a selected bin, the selected bin being a multi-stock bin that according to the records contains stock for a highest number of unique ones of the required stock-keeping units (SKUs) indicated on the stock waitlist;

sending a command to a robot to fetch the selected bin from the bin storage facility and deliver the selected bin to the workstation; and updating the stock waitlist for the workstation by removing each of the required stock-keeping units (SKUs) for which there is sufficient stock included in the selected bin.

29. The method of claim 28, wherein the method further comprises, after updating the stock waitlist for the workstation by adding quantities of each of the desired stock-keeping units (SKUs) specified in the highest-weighted pending order:

selecting a second bin of the bin storage facility as a second selected bin, the second selected bin containing stock for a new greatest number of unique required stock-keeping units (SKUs) indicated on the stock waitlist;

sending a second command to the robot to fetch the second selected bin from the bin storage facility and deliver the second selected bin to the workstation; and updating the stock waitlist for the workstation by removing each of the required stock-keeping units (SKUs) for which there is sufficient stock included in the second selected bin.

30. The method of claim 29, further comprising:

selecting a third bin of the bin storage facility as a third selected bin, the third selected bin containing stock to fulfill an oldest order currently assigned to the workstation;

sending a third command to the robot to fetch the third selected bin from the bin storage facility and deliver the third selected bin to the workstation; and updating the stock waitlist for the workstation by removing each of the required stock-keeping units (SKUs) for which there is sufficient stock included in the third selected bin.

31. The method of claim 30, further comprising:

selecting a fourth bin of the bin storage facility as a fourth selected bin, the fourth selected bin containing stock to fulfill a highest priority order currently assigned to the workstation;

sending a fourth command to the robot to fetch the fourth selected bin from the bin storage facility and deliver the fourth selected bin to the workstation; and updating the stock waitlist for the workstation by removing each of the required stock-keeping units (SKUs) for which there is sufficient stock included in the fourth selected bin.

32. The method of claim 31, further comprising:

selecting a fifth bin of the bin storage facility as a fifth selected bin according to an inventory selection strategy, wherein the inventory selection strategy comprises lowest inventory, highest inventory, oldest inventory, and newest inventory;

sending a fifth command to the robot to fetch the fifth selected bin from the bin storage facility and deliver the fifth selected bin to the workstation; and updating the stock waitlist for the workstation by removing each of the required stock-keeping units (SKUs) for which there is sufficient stock included in the fifth selected bin.

33. A controller of an automated storage and retrieval system, the controller comprising at least one processor configured by executed software loaded from a storage medium to:

store a plurality of records indicating particular stock-keeping units (SKUs) for which there is stock in each bin of a bin storage facility having a plurality of bins physically stored therein, the plurality of the bins in the bin storage facility being multi-stock bins that hold stock for a plurality of different stock-keeping units (SKUs);

track a stock waitlist for a plurality of workstations, the stock waitlist indicating quantities of required stock-keeping units (SKUs) still required to be delivered to each of the workstations in order to fulfill the current orders assigned thereto, the workstations being locations at which a picking agent picks stock from the bins of the bin storage facility in order to fulfill the current orders assigned thereto;

receive pending orders from an order system, each of the pending orders specifying quantities of desired stock-keeping units (SKUs);

for each pending order, determine a workstation, based on the stock waitlist corresponding to each of the workstations, to assign the pending order, such that the number of bins required to be delivered to the workstation to fulfill the pending order is minimized;

calculate order weights respectively corresponding to each of the pending orders, and wherein the order weights are calculated as a function of a number of bins that would need to be delivered to the workstation assuming the pending order is assigned to the workstation, items picked per bin presentation (IPP), a predetermined global factor for IPP, current processing time for an order, a predetermined global factor for current processing time, order priority, and a predetermined global factor for order priority; and compare the order weights of the pending orders and assign a highest-weighted pending order to the workstation.

34. A non-transitory computer-readable storage medium comprising processer computer executable instructions, that when executed by at least processor, cause the processor to:

store a plurality of records indicating a particular one or more stock-keeping units (SKUs) for which there is stock in each bin of a bin storage facility having a plurality of bins physically stored therein, the plurality of the bins in the bin storage facility being multi-stock bins that hold stock for a plurality of different stock-keeping units (SKUs);

track a stock waitlist for a plurality of workstations, the stock waitlist indicating quantities of one or more required stock-keeping units (SKUs) still required to be delivered to each of the workstations in order to fulfill the current orders assigned thereto, the workstations being locations at which a picking agent picks stock from the bins of the bin storage facility in order to fulfill the current orders assigned thereto;

receive pending orders from an order system, each of the pending orders specifying quantities of desired stock-keeping units (SKUs);

for each pending order, determine a workstation, based on the stock waitlist corresponding to each of the workstations, to assign the pending order, such that the number of bins required to be delivered to the workstation to fulfill the pending order is minimized;

calculate order weights respectively corresponding to each of the pending orders, and wherein the order weights are calculated as a function of a number of bins that would need to be delivered to the workstation assuming the pending order is assigned to the workstation, items picked per bin presentation (IPP), a predetermined global factor for IPP, current processing time for an order, a predetermined global factor for current processing time, order priority, and a predetermined global factor for order priority; and compare the order weights of the pending orders and assign a highest-weighted pending order to the workstation.

* * * * *